(12) United States Patent  
Owa et al.

(10) Patent No.: US 6,711,379 B1  
(45) Date of Patent: Mar. 23, 2004

(54) DIGITAL BROADCASTING SYSTEM AND TERMINAL THEREFOR

(75) Inventors: Tsutomu Owa, Yokohama (JP); Toru Terauchi, Tokyo (JP); Shigeru Tashiro, Yokohama (JP); Satoshi Miyagawa, Hoya (JP); Koji Nakashima, Mitaka (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/463,577

(22) PCT Filed: May 28, 1999

(86) PCT No.: PCT/JP99/02849

§ 371 (c)(1),  
(2), (4) Date: Jan. 28, 2000

(87) PCT Pub. No.: WO99/62254

PCT Pub. Date: Dec. 2, 1999

(30) Foreign Application Priority Data

May 28, 1998 (JP) .............................. 10-148170  
May 28, 1998 (JP) .............................. 10-148171

(51) Int. Cl.[7] .............................. H04H 1/00; H04Q 1/30  
(52) U.S. Cl. ................... 455/3.01; 455/3.02; 455/3.05; 455/3.06; 345/723; 340/7.48; 340/7.55; 340/7.56; 725/68; 725/70  
(58) Field of Search .............................. 455/3.01, 3.05, 455/3.06, 3.02, 12.1; 725/68, 70; 345/723; 340/7.48, 7.55, 7.56, 825.49, 539.2, 995.1

(56) References Cited

U.S. PATENT DOCUMENTS 5,594,936 A * 1/1997 Rebec et al. ................. 455/3.2
5,790,937 A * 8/1998 Gutle ........................... 455/6.3
5,886,995 A * 3/1999 Arsenault et al. ........... 370/477
5,913,170 A * 6/1999 Wortham ..................... 455/457
5,915,020 A * 6/1999 Tilford et al. ................. 380/10
6,295,380 B1 * 9/2001 Takahashi .................... 382/240

FOREIGN PATENT DOCUMENTS

| JP | 5-316079 | 11/1993 |
|---|---|---|
| JP | 8-23314 | 1/1996 |
| JP | 8-110231 | 4/1996 |
| JP | 9-46305 | 2/1997 |
| JP | 9-120499 | 5/1997 |
| JP | 9-289498 | 11/1997 |
| JP | 10-4539 | 1/1998 |
| JP | 10-505441 | 5/1998 |
| JP | 10-276382 | 10/1998 |

* cited by examiner

*Primary Examiner*—Vivian Chin  
(74) *Attorney, Agent, or Firm*—Oblon, Spivak, McClelland, Maier & Neustadt, P.C.

(57) ABSTRACT

The terminal device is equipped with a location judgment database which stores setting data indicating the relationships between the location of the self device and the corresponding object to be presented to the user. On the basis of the location detection data obtained by detecting the location of the self device by receiving range signals transmitted by a plurality of GPS satellites and the setting data stored in the location judgment database, corresponding objects are selected from a plurality of objects received and decoded and they are synthesized and presented as they are output to the display or the speaker. Thus, an optimal object presentation can be achieved in accordance with the status of the terminal device.

22 Claims, 27 Drawing Sheets

LOCATION JUDGMENT DATA BASE

| REGION | OBJECT (DEFAULT) | SETTIING OBJECT |
|---|---|---|
| TOKYO | TOKYO 0 : CHARACTER 1 | TOKYO 1 : VISUAL 1 |
| YOKOHAMA | YOKOHAMA 1 : CHARACTER 2 | YOKOHAMA 1 : AUDIO 3, VISUAL 2 |
| KANTO | | NONE |
| OTHERS | ALL OF JAPAN 0 : CHARACTER 0 | NONE |

FIG. 5

DB RENEWAL DATA

| SCENE DESCRIPTION COMMAND ID | MODE | REGION | OBJECT (DEFAULT) | SETTIING OBJECT |
|---|---|---|---|---|
| DB REVISION | ADD | KAWASAKI | KAWASAKI 0 : CHARACTER 0 | |
| DB REVISION | DELETE | YOKOHAMA | | |
| DB REVISION | RENEW | TOKYO | TOKYO 0 : CHARACTER 1 | TOKYO 2 : CHARACTER 1 |

FIG. 6

LOCATION JUDGMENT DATA BASE (AFTER RENEWAL)

| REGION | OBJECT (DEFAULT) | SETTIING OBJECT |
|---|---|---|
| TOKYO | TOKYO 0 : CHARACTER 1 | TOKYO 2 : CHARACTER 1 |
| KAWASAKI | KAWASAKI 0 : CHARACTER 0 | |
| KANTO | | NONE |
| OTHERS | ALL OF JAPAN 0 : CHARACTER 0 | NONE |

FIG. 7

RUNNING STATE JUDGMENT DATA BASE 55B

| RUNNING STATE | DEFAULT DATA | FILTERING DATA |
|---|---|---|
| STANDING | NONE | IMAGE, AUDIO, CHARACTER |
| RUNNING | AUDIO, TEXT | AUDIO |

FIG. 10

PRESENTATION TYPE JUDGMENT DATA BASE

| DEVICE TYPE | OBJECT TYPE |
|---|---|
| SPEAKER | AUDIO |
| LOW-RESOLUTION LCD | CHARACTER |
| HIGH-RESOLUTION LCD | IMAGE, CHARACTER |

SCENE DESCRIPTION DATA
(WITH REGION DESIGNATING FUNCTION)

| | START TIME | END TIME | REGION |
|---|---|---|---|
| SCENE 1 | 10:00 | 10:05 | — |
| AUDIO 1 | 10:00 | 10:01 | TOKYO |
| CHARACTER 1 | 10:00 | 10:05 | NATION WIDE |
| IMAGE 1 | 10:00 | 10:05 | TOKYO |
| AUDIO 2 | 10:00 | 10:03 | KANAGAWA |
| IMAGE 2 | 10:00 | 10:05 | KANAGAWA |

FIG. 16

SCENE DESCRIPTION DATA
(WITH RUNNING STATE DESIGNATING FUNCTION)

| | START TIME | END TIME | PRESENT WHILE RUNNING |
|---|---|---|---|
| SCENE 1 | 10:00 | 10:05 | — |
| AUDIO 1 | 10:00 | 10:01 | ON |
| CHARACTER 1 | 10:00 | 10:05 | OFF |
| IMAGE 1 | 10:00 | 10:05 | OFF |

FIG. 17

SCENE DESCRIPTION LANGUAGE
(WITH CONNECTION DEVICE
DESIGNATING FUNCTION)

| | START TIME | END TIME | PRESENTATION DEVICE TYPE |
|---|---|---|---|
| SCENE 1 | 10:00 | 10:05 | — |
| AUDIO 1 | 10:00 | 10:01 | SPEAKER |
| CHARACTER 1 | 10:00 | 10:05 | LOW-RESOLUTION LCD, HIGH-RESOLUTION LCD |
| IMAGE 1 | 10:00 | 10:05 | HIGH-RESOLUTION LCD |

FIG. 22

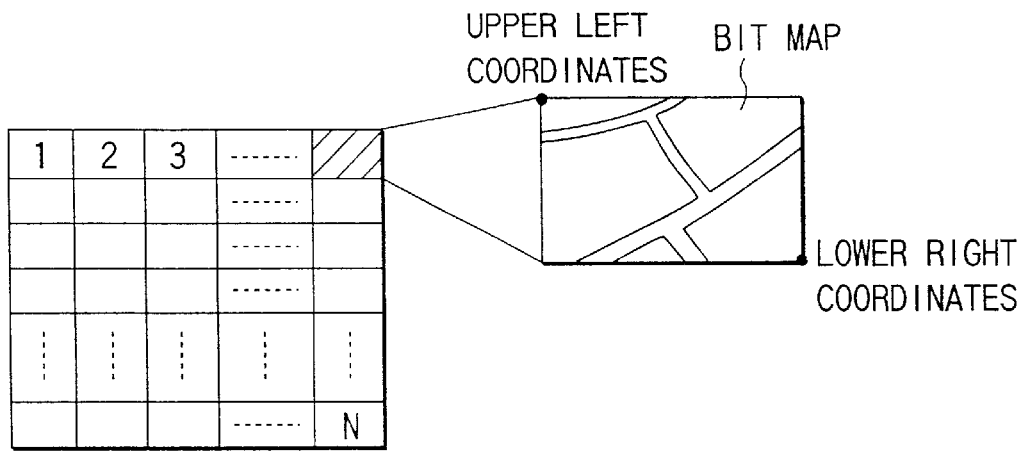

FIG. 25A  FIG. 25B

| EREA NO. | TYPE OF DATA | CONTENTS OF DATA |
|---|---|---|
| 1 | UPPER LEFT COORDINATES | NORTH LATITUDE ○○ DEGREES |
|  |  | EAST LONGITUDE ×× DEGREES |
|  | LOWER RIGHT COORDINATES | NORTH LATITUDE ○○ DEGREES |
|  |  | EAST LONGITUDE ×× DEGREES |
|  | MAP | BIT MAP 1 |
| 2 | UPPER LEFT COORDINATES | NORTH LATITUDE ○○ DEGREES |
|  |  | EAST LONGITUDE ×× DEGREES |
|  | LOWER RIGHT COORDINATES | NORTH LATITUDE ○○ DEGREES |
|  |  | EAST LONGITUDE ×× DEGREES |
|  | MAP | BIT MAP 2 |
| N |  |  |

FIG. 26

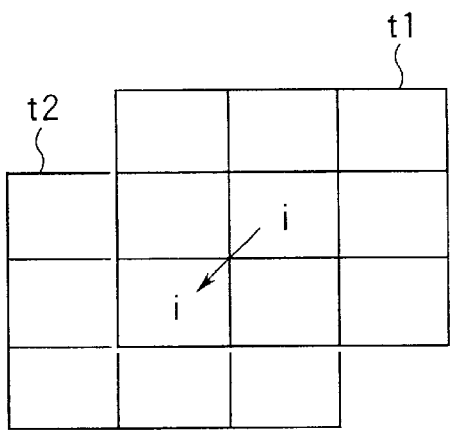

FIG. 28

| SERVICE DATA NO. | TYPE OF SERVICE | CONTENTS OF SERVICE |
|---|---|---|
| 1 | SERVICE TYPE | MOVIE THEATER |
|  | LOCATION | NORTH LATITUDE ○○ DEGREES<br>EAST LONGITUDE ×× DEGREES |
|  | TITLE | CINEMA 1 |
|  | SERVER ADDRESS | ××-××××-×××× |
|  | ADDITIONAL DATA | STILL IMAGE, SOUND |
| 2 | SERVICE TYPE | CONVENIENCE STORE |
|  | LOCATION | NORTH LATITUDE ○○ DEGREES<br>EAST LONGITUDE ×× DEGREES |
|  | TITLE | A STORE 1 |
|  | SERVER ADDRESS | ××-××××-×××× |
|  | ADDITIONAL DATA | CHARACTER DATA |
| M |  |  |

FIG. 29

| LINK NO | INTERSECT 1 | COORDINATES 1 OF INTERSECT | INTERSECT 2 | COORDINATES 2 OF INTERSECT |
|---|---|---|---|---|
| 1 | EXIT ** | EAST LONGITUDE XX° XX' NORTH LATITUDE xx° xx' | EXIT ** | EAST LONGITUDE XX° XX' NORTH LATITUDE xx° xx' |
| 2 | EXIT ** | EAST LONGITUDE XX° XX' NORTH LATITUDE YY° yy' | JCT ** | EAST LONGITUDE XX° XX' NORTH LATITUDE YY° yy' |
| | | | | |
| N | STATION ** | EAST LONGITUDE XX° XX' NORTH LATITUDE YY° yy' | ENTRANCE ** | EAST LONGITUDE XX° XX' NORTH LATITUDE YY° yy' |

FIG. 33

DIGITAL BROADCASTING SYSTEM AND TERMINAL THEREFOR

TECHNICAL FIELD

The present invention relates to a digital broadcasting system for broadcast multimedia data consisting of picture, sound, text and the like, to a terminal device built in a mobile station, and to the terminal device.

BACKGROUND ART

Conventionally, in the field of television broadcasting, the digitalization of ground-based broadcasting and satellite broadcasting has been developed, and some of them are presently brought into practice. However, these techniques are basically for the broadcasting to fixed terminal devices, and in the case where a terminal device is built in a mobile station, it is considered to be difficult technically to provide an appropriate service which is in accordance with the state of the use thereof. In particular, the contents of programs in the broadcasting are all reproduced similarly by all terminal devices, and thus it is not possible to play selectively a part of the contents of a program upon the designation of a user, a broadcast station or a use condition.

In the meantime, there is an increasing demand of a digital broadcasting system which broadcasts multimedia data containing picture, sound, texts and the like, to terminal devices built in, mainly, mobile stations. However, in order to satisfy such a demand, it is essential to solve the above-described drawbacks that is technically difficult with a conventional television broadcasting system.

DISCLOSURE OF THE INVENTION

The present invention has been proposed by focusing on the above-described circumstances, and the main object thereof is to provide a digital broadcasting system which not only merely provides a program as a broadcast service when broadcast multimedia data containing picture, sound, texts and the like, to a terminal device built in, mainly, a mobile station, but also is capable of presenting data which can flexibly follow up the needs and the use state of the user with the program contents themselves, as well as a terminal device therefor.

Particularly, the first object of the present invention is to provide a digital broadcasting system capable of presenting data optimal to the status of the terminal device, together with a terminal device.

Further, the second object of the present invention is to provide a digital broadcasting system for providing a broadcasting service from a new point of view, and capable of contributing to the development of the information society, by integrating a plurality of broadcasting services together and further integrating a new service with a conventional medium.

In order to achieve the main object, according to the present invention, there is provided a digital broadcasting system which converts one or more objects which constitute each scene of a presented program, into a broadcast signal at a broadcast station, to be broadcasted to a predetermined service area, and a terminal device for receiving the broadcast signal, from which the objects are reproduced and synthesized appropriately to reproduce the program.

With the above-described system structure, each scene of a program is constituted by one or more objects to be transmitted as a signal, and therefore it becomes possible to select the object as needed on the signal receiving side, to be reproduced. Therefore, it becomes possible to play a part of the contents of the program selectively upon the designation of the user, or the broadcast station side, and the use conditions, and thus as the contents of the program themselves, the presentation of data can be carried out flexibly with the needs of the user or the status of the use.

Here, in order to achieve the first object of the present invention, there is provided a terminal device used in a digital broadcasting system in which scene data having one or more objects is converted into a broadcast signal in a broadcast station, and the broadcast signal is transmitted directly or in relay through a satellite, to broadcast it to a predetermined service area, including: status detection means for detecting a predetermined status of the device itself; a database which stores setting data which indicates a corresponding relationship between the status of the device itself and the object presented to the user; and an object selection means. With the object selection means, an object to be presented is selected from a plurality of objects received, on the basis of the detection result of the status detection means and the setting data in the database, and thus selected object is presented to the presenting device.

Specifically, the following three structures can be considered.

According to the first structure, location detection means for detecting the present location of the device itself is provided for the status detection means, setting data which indicates a corresponding relationship between the status of the device itself and the object to be presented to the user is stored in a database. With the object selection means, an object corresponding to the present location of the self device is selected from a plurality of objects received, on the basis of the present location of the self device detected by the location detection means and the setting data in the database, and thus selected object is presented to the presenting device.

According to the second structure, moving state detection means for detecting the moving state of the device itself is provided for the status detection means, setting data which indicates a corresponding relationship between the moving state of the device itself and the object to be presented to the user is stored in a database. With the object selection means, an object corresponding to the moving state of the self device is selected from a plurality of objects received, on the basis of the moving state of the self device detected by the moving state detection means and the setting data in the database, and thus selected object is presented to the presenting device.

According to the third structure, presentation type detection means for detecting the type of the presentation device is provided for the status detection means, setting data which indicates a corresponding relationship between the type of the presentation device and the object presented to the user is stored in a database. With the object selection means, an object corresponding to the type of the presentation device is selected from a plurality of objects received, the basis of the type of the presentation device detected by the presentation type detection means and the setting data in the database, and thus selected object is presented to the presenting device.

Therefore, in the terminal device according to the present invention, an optimal object for a particular occasion can be selected and presented in accordance with various situations of the terminal device, such as the present location of the terminal device, the moving state of the terminal device and the type of the presentation device. Therefore, a further effective object presentation is provided for the terminal user.

Meanwhile, according to the present invention, there is provided a digital broadcasting system and a terminal device used in the digital broadcasting system, in which scene description data used for synthesizing a plurality of objects is converted into a broadcast signal in a broadcast station, and the signal broadcast signal is transmitted directly or in relay through a satellite, to broadcast it to a terminal device located within a predetermined service area on the ground, wherein: condition designation data transmission means for transmitting condition designation data for designating the presentation condition of an object, by containing it in the scene description data, is provided in the broadcast station, whereas status detection means for detecting a predetermined status of the device itself, and object selection means are provided in the terminal device, and with the object selection means, an object to be presented is selected from a plurality of objects received, on the basis of the detection result of the status detection means and the condition designation data contained in the scene description data received by the signal receiving means, and thus selected object is presented to the presenting device.

As the case described before, the following three structures can be considered.

According to the first structure, in condition designation data transmitting means of a broadcast station, area designation data for designating a presentation area is added to each one of the objects which constitute a scene, to be transmitted, whereas in the terminal device, location detection means for detecting a present location of the self device is provided for status detection means, and in object selection means, the present location of the self device detected by the location detection means and the area designation data contained in the scene description data received are compared with each other, and an object corresponding to the present location of the self device is selected on the basis of the result of the comparison, and then is presented on a presentation device.

According to the second structure, from the condition designation data transmitting means of the broadcast station, moving state designation data for presenting a data in accordance with the moving state of the terminal device for each one of the objects which constitute a scene, is transmitted, whereas in the terminal device, location detection means for detecting a present location of the self device is provided for status detection means, and in object selection means, the moving state of the device detected by the moving state detection means and the moving state type designation data contained in the scene description data received are compared with each other, and an object corresponding to the moving state of the self device is selected on the basis of the result of the comparison, and then is presented on a presentation device.

According to the third structure, from the condition designation data transmitting means of the broadcast station, type designation data for designating a type of the presentation device capable of presenting a data for each one of the objects which constitute a scene, is transmitted, whereas in the terminal device, presentation type detection means for detecting a type of the presentation device is provided for status detection means, and in object selection means, the type of the presentation device detected by the presentation type detection means and the type designation data contained in the scene description data received are compared with each other, and an object corresponding to the designated presentation device is selected on the basis of the result of the comparison, and then is presented on a presentation device.

Therefore, with the digital broadcast system and it terminal device according to the present invention, the most appropriate object is selected and presented in the terminal device in each time, in accordance with the various status of the terminal device such as the present location of the terminal device, the moving state of the terminal device, and the type of the presentation device, as well as in compliance with conditions designated by the broadcast station side. Therefore, the presentation of an object can be more effective for the terminal user. Further, the condition of the presentation of an object can be arbitrarily designated by the broadcast station side.

In order to achieve the second object described above, according to the present invention, there is provided a digital broadcasting system for providing broadcast services including at least one of picture, sound and data in each of a plurality of channels, wherein of broadcast signals of the above-mentioned channels, broadcast services which are relevant to each other can be provided for each other between arbitrary channels, and a plurality of channels provided with broadcast services relevant to each other are received and synthesized on the signal receiving side, thus achieving the integration of a plurality of broadcast services.

Further, by providing data related to other communication or broadcast data than that of the present digital broadcasting by the relevant broadcast services described above, the integration with some other media can be achieved.

Further, the terminal device used for the digital broadcasting system, comprises: a broadcast signal receiver for receiving broadcast services which are relevant to each other, which can be provided for each other between arbitrary channels, of broadcast signals of the above-mentioned channels; data synthesizing means for synthesizing a plurality of broadcast services relevant to each other, which are received by the broadcast signal receiver, thereby presenting thus synthesized services as one broadcast service; and a display and sound reproduction device for presenting a picture and sound of the broadcast service presented by the means, thereby achieving to provide data in which a plurality of broadcast services are integrated.

Here, when data relevant to communication or broadcasting data other than that of the present digital broadcasting is provided in the broadcast service, the communication and broadcasting data are obtained on the basis of the relevant data, and are made presentable, thus achieving to provide data integrated with other media.

BRIEF DESCRIPTION OF THE DRAWINGS

FIG. 5 is a diagram showing an example of a structure of a location judgment database provided in the terminal device shown in FIG. 3;

FIG. 6 is a diagram showing an example of renewal data of the location judgment database;

FIG. 7 is a diagram showing a result of renewal of the location judgment database;

FIG. 10 is a diagram showing an example of a structure of a running state judgment database provided in the terminal device shown in FIG. 8;

FIG. 11 is a diagram showing an example of a structure of a presentation type judgment database provided in a terminal device according to the third embodiment of the present invention;

FIG. 16 is a diagram showing an example of a structure of scene description data having an area designation function, used in the fourth embodiment of the present invention;

FIG. 17 is a diagram showing an example of a structure of scene description data having a running state designation function, used in the fifth embodiment of the present invention;

FIG. 22 is a diagram showing an example of a structure of scene description data having a running state designation function, used in the sixth embodiment of the present invention;

FIGS. 25A and 25B each are an explanatory diagram illustrating how to provide map data in the seventh embodiment of the present invention;

FIG. 26 is a diagram showing a type and contents of data at each divisional area number in the map data shown in FIG. 25;

FIG. 28 is an explanatory diagram illustrating a data acquiring area of the map data shown in FIG. 25;

FIG. 29 is a diagram showing a type and contents of a service corresponding to each service data number of local data services in the seventh embodiment of the present invention;

FIG. 33 is a diagram specifically illustrating the integration with the ITS data in the seventh embodiment of the present invention.

BEST MODE OF CARRYING OUT THE INVENTION

Figure 1:
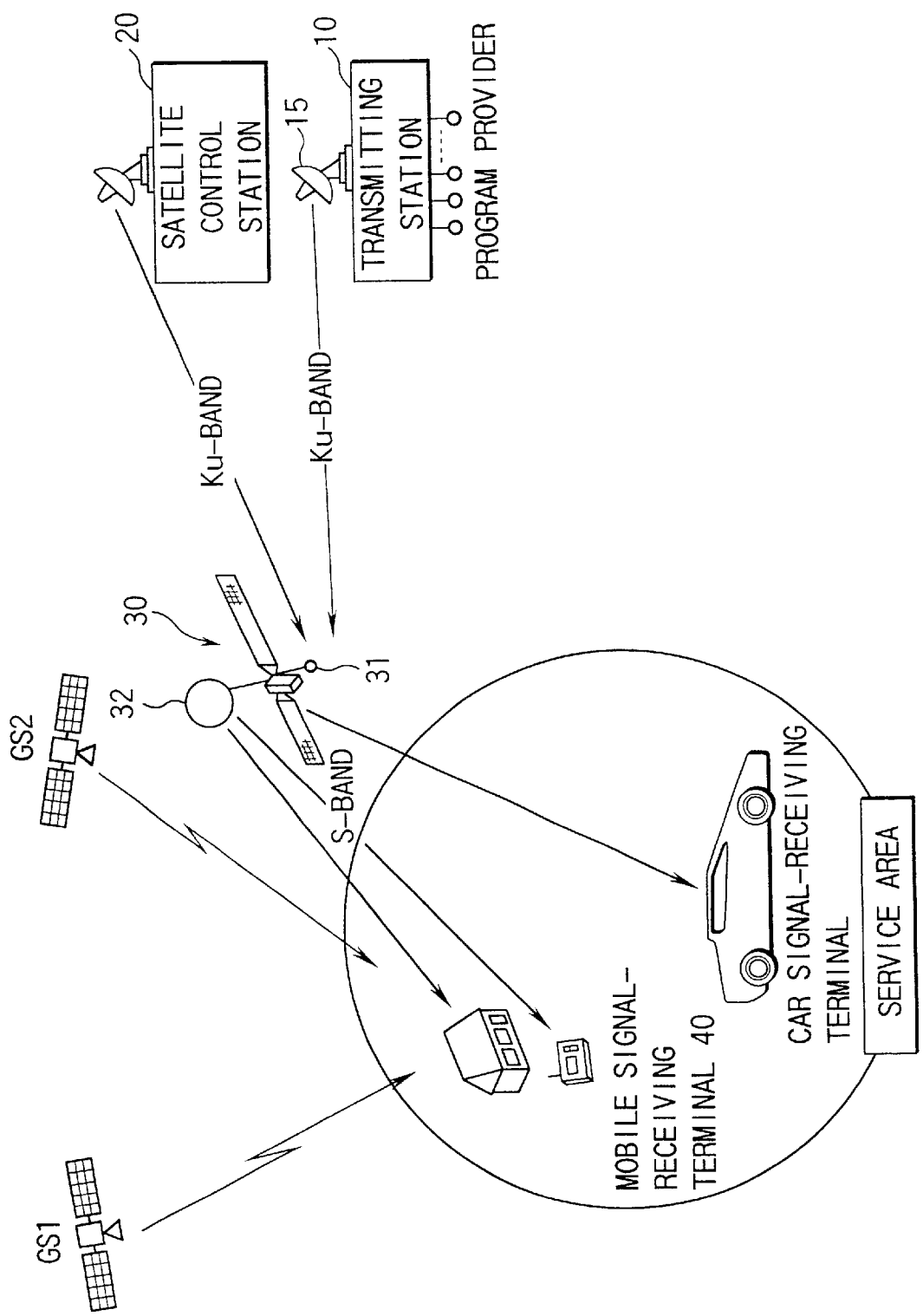
FIG. 1 is a schematic diagram showing the structure of a digital satellite broadcasting system according to the first to sixth embodiments of the present invention.

Embodiments of the present invention will now be described in detail with reference to accompanying drawings.

First, a brief description of the digital broadcast system used in the embodiments will be first provided.

The system uses a broadcast satellite or communication satellite, and is designed mainly for a mobile station. As a coding method, MPEG4 (moving picture coding experts group 4) is employed, and an S-band is used for a downlink from a satellite to a terminal device. Thus, in a mobile terminal device such as a car-equipped terminal device or mobile data terminal device, multimedia data containing picture, sound, texts and the like, can be received.

In this system, as described before, the use of MPEG4 is assumed. The MPEG4 is designed to express a scene by synthesizing hierarchical visual/acoustic signals made of a plurality of AVOs (audio/visual objects: structural elements represented such as person and background), as compared to the conventional motion picture coding mode, by which, basically, an image is simply encoded as a scene. Each hierarchical structural element may be a natural picture/sound or a synthesized image/sound. It may show an entire scene or a part of a scene. Further, a high degree of freedom can be obtained in the overlapping of structural elements or the temporal/spatial relationship.

That is, in the present system which uses the MPEG4, a plurality of objects which constitute one scene and scene synthesizing data for synthesizing these objects are encoded in an elementary stream each at an optimal algorithm, and then after a while, they are multiplexed to be transmitted. On the receiving side, each of the received objects and scene description data received is encoded, and then the objects are synthesized in accordance with the contents of the scene description data, and output to presentation devices such as a display and speaker.

With the above-described system structure, each of the scenes of program contents is constituted by one or more objects, and therefore it becomes possible to select an object in accordance with necessity on the receiving side, to be played. With this structure, a part of the program contents can be selectively played on the basis of the designation of the user, designation of the broadcast station side and the usage conditions. Therefore, it becomes possible to provide data presentation which flexibly meets with the needs of the user and the use state by means of the program contents themselves.

Meanwhile, when objects are synthesized and presented on the basis of, only the scene description data, there is a possibility that an inappropriate presentation depending upon the status of the terminal device. For example, in the case where an object has data regarding a region, if the object is displayed at all times, an object which is regardless of the present location of the terminal device is displayed on itself. Further, in the case of a terminal device which is carried in a car, when display data such as an image or text data is displayed on the display while driving, the driver cannot concentrate on driving as being distracted by the display, and therefore it is not preferable in terms of traffic safety.

On the other hand, in connection with the new broadcast system described above, it is recommended that a nationwide broadcast and a regional broadcast can be arbitrarily selected by the structure that each of a plurality of broadcast stations can independently specify a broadcast service area. Here, in the terminal device mounted in a mobile station, if broadcast services which are required along with the motion can be received at the same time, a significant effect is brought out for the user. Further, if it is possible to integrate with conventional media such as ground-wave broadcast (television broadcast, radio broadcast), or communication means through public communication network, a new living environment can be provided for the users, thus contributing to the development of the information society.

The digital broadcast system entailing the above-described problem will now be described with reference to embodiments.

(First Embodiment)

The first embodiment of the present invention has a structure that a terminal device includes a location judgment database which stores setting data indicating the relationship between the location of the self device and an object to be presented to the user. The location of the self device is detected by receiving range signals transmitted from a plurality of GPS (global positioning system) satellites, and on the basis of thus detected location data and the setting data stored in the location judgment database, objects corresponding to the present location of the self device are selected out of a plurality of objects received and decoded, and thus selected objects are synthesized or displayed or output from a speaker.

FIG. 1 is a schematic structural view of a digital satellite broadcast system according to the present invention. The digital satellite broadcast system includes at least one transmitting station 10, a satellite control station 20 and geostationary satellite 30.

The transmitting station 10 receives program data formed and edited by a plurality of program providers, and channel-multiplexing the program data to be then converted into a broadcast signal, which is transmitted to the geostationary satellite 30 via, for example, an ascending transmitting path of the Ku band (12.5 to 18 GHz). As the channel multiplexing system, for example, a CDM (code division multiplex) system is used.

The geostationary satellite 30 includes a Ku-band antenna 31 having a diameter of, for example, 2.5 m-class, and an S-band antenna 32 (for example, 2.6 GHz) having a diameter of, for example, 15 m-class. The broadcast signal transmitted from the transmitting station 10 is received by the Ku-band antenna 31, and then converted by a transponder into an S-band signal. Thus converted broadcast signal is transmitted from the S-band antenna 32 towards a service area via a descending transmitting path of the S-band. The diameter of the ascending transmitting antenna 31 equipped in the geostationary satellite 31 may be smaller than that of a 2.5 m class, and the diameter of the S-band antenna 32 is not limited to 15-m class but may be of a 8-m class.

It should be noted that the satellite control station 20 monitors the operation state of the geostationary satellite 30 to control it.

In the service area, a broadcast signal receiving device (not shown), for example, fixedly installed in an office or home, or a movable terminal device 40 of a type which is carried in an automobile or of a portable type, can receive a broadcast signal transmitted to the descending transmitting path of the S-band from the geostationary satellite 30. In the descending transmitting path of the S-band, a plurality of channels (for example, 30 channels) having a transmitting capacitance of 256 kbps are multiplexed. Here, the MPEG4 is used as the method of encoding transmitting data.

Figure 2:
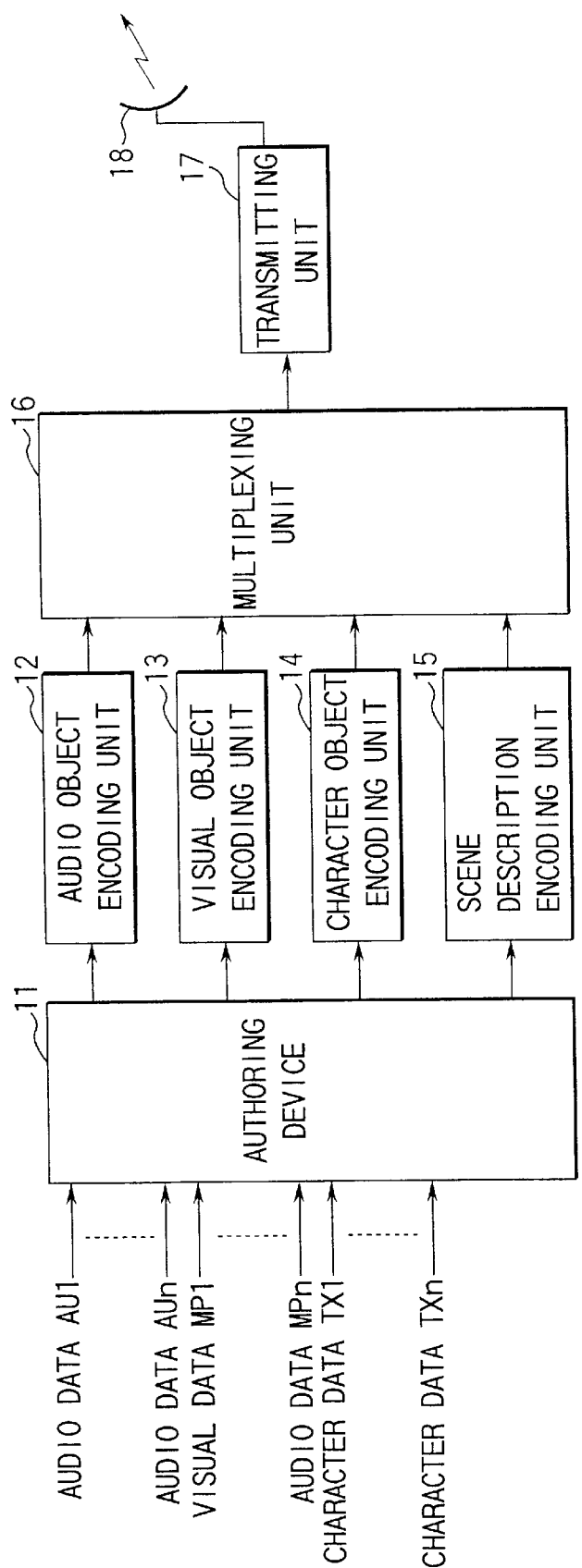
FIG. 2 is a circuit block diagram showing a structure of a signal transmission station in the system shown in FIG. 1.
Figure 3:
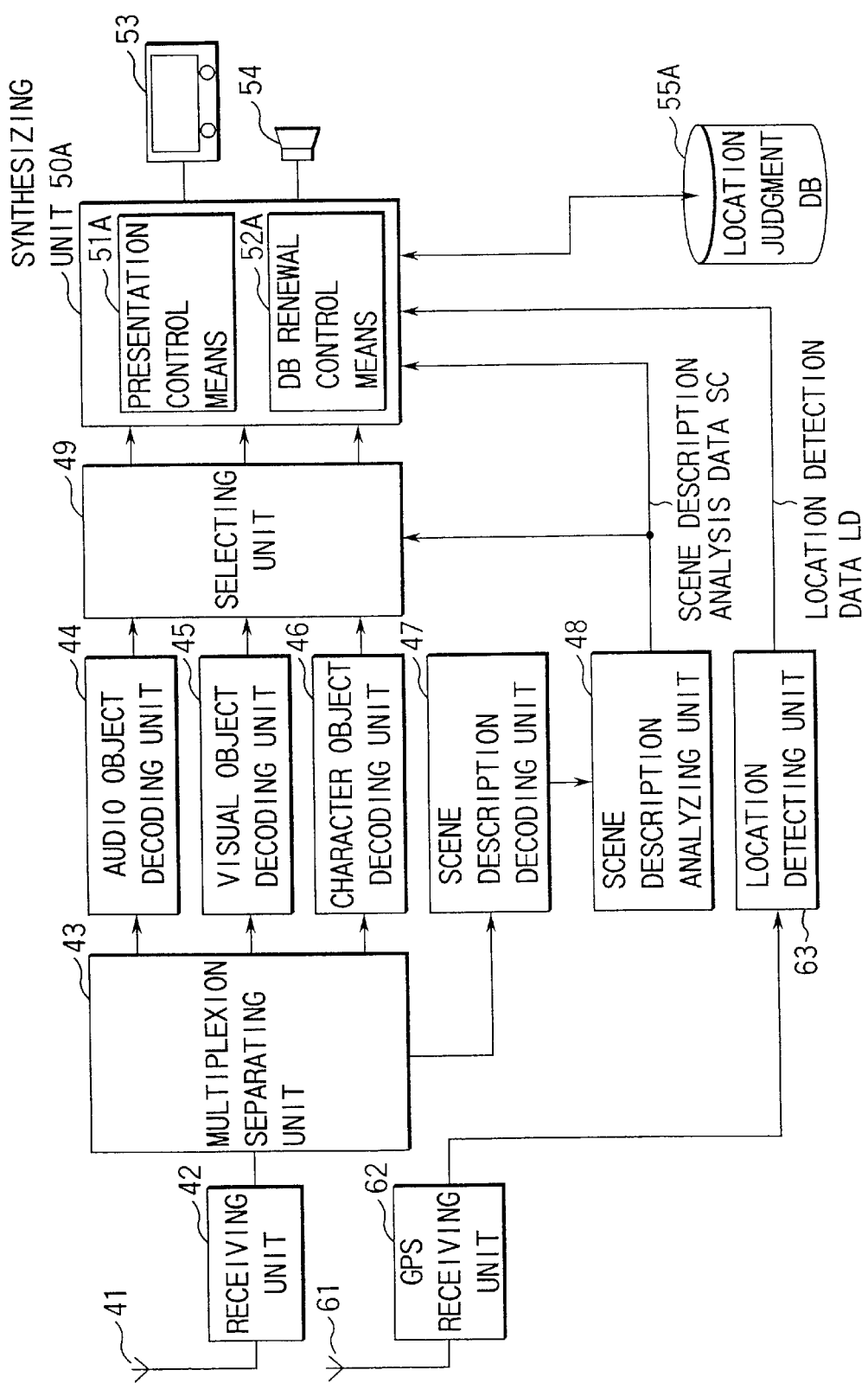
FIG. 3 is a circuit block diagram showing a structure of a terminal device according to the first embodiment of the present invention.

It should be noted that the transmitting station 10 and the terminal device 40 are constitute by the following structures, respectively. FIG. 2 is a circuit block diagram showing the structure of the transmitting station 10 and FIG. 3 is a block diagram showing the structure of the terminal device 40.

First, the transmitting station 10 comprises an authoring device 11. The authoring device 11 creates scene data in compliance with the MPEG4 by selectively using audio data AU1 to AUn, visual data MP1 to MPn and text data TX1 to TXn, supplied from program providers. The scene data includes a plurality of objects, namely, the above-mentioned audio data, visual data and text data, as well as scene description data used for synthesizing these objects.

The audio data, visual data, text data and scene description data, output from the authoring device 11 are respectively input to an audio object encoding unit 12, a visual object encoding unit 13, a text object encoding unit 14 and a scene description encoding unit 15. In these encoding units 12 to 15, the audio data, visual data, text data and scene description data are encoded into elementary streams respectively each by an optimal algorithm which corresponds to the characteristics of the respective data. Subsequently, thus encoded elementary streams are multiplexed by a multiplexing unit 16 in compliance with a predetermined format, into a multiplex stream. Then, the multiplex stream is digital-modulated by the transmitting unit 17, and further converted into a Ku-band broadcast signal, then it is transmitted from the transmitting antenna 18 towards the geostationary satellite 30.

Next, the terminal device 40 receives an S-band broadcast signal transmitted from the geostationary satellite 30 via a signal receiving antenna 41, and the signal is input to a signal receiving unit 42. In the signal receiving unit 42, frequency conversion and digital decoding are carried out on the broadcast signal, and thus decoded multiplex stream is a multiplex separation unit 43. The multiplex separation unit 43 separates the multiplex stream into a plurality of elementary streams, and these elementary streams are input to an audio object decoding unit 44, a visual object decoding unit 45, a text object decoding unit 46 and a scene description decoding unit 47.

The audio object decoding unit 44, the visual object decoding unit 45, the text object decoding unit 46 and the scene description decoding unit 47 decode the above-mentioned element streams respectively, so as to play an audio object, visual object, text object and scene object, and thus decoded audio object, visual object and text object are input to a synthesizing unit 50A via a selecting unit 49.

The scene description data decoded by the scene description decoding unit 47 is input to a scene description analyzing unit 48. The scene description analyzing unit 48 analyzes the scene description data, and thus analyzed data SC is given to the selecting unit 49, thus passing objects necessary to synthesize the scene. The scene description analyzing unit 48 gives the scene description analyzed data SC also to the synthesizing unit 50A.

In the meantime, the terminal device 40 includes a GPS signal receiving unit 62, and ranging signals transmitted from GPS satellites GS1, GS2, . . . , are the present location is stored, the objects corresponding this region are selected from a plurality of received objects input from the selecting unit 49. The selected objects are synthesized in accordance with the scene description analysis data SC, and then supplied to a display 53 or a speaker 54, or both of them.

In the case where DB renewal data is sent by using scene description data from the transmitting station 10, a DB renewal control means 52A carry out a process of renewing corresponding data within the location judgment database 55A in accordance with the contents of the renewal data analyzed by the scene description analyzing unit 48. The renewal process includes revision and deletion of a region already registered and an object corresponding thereto, and addition of a region which has not yet been registered and an object corresponding thereto.

Figure 4:
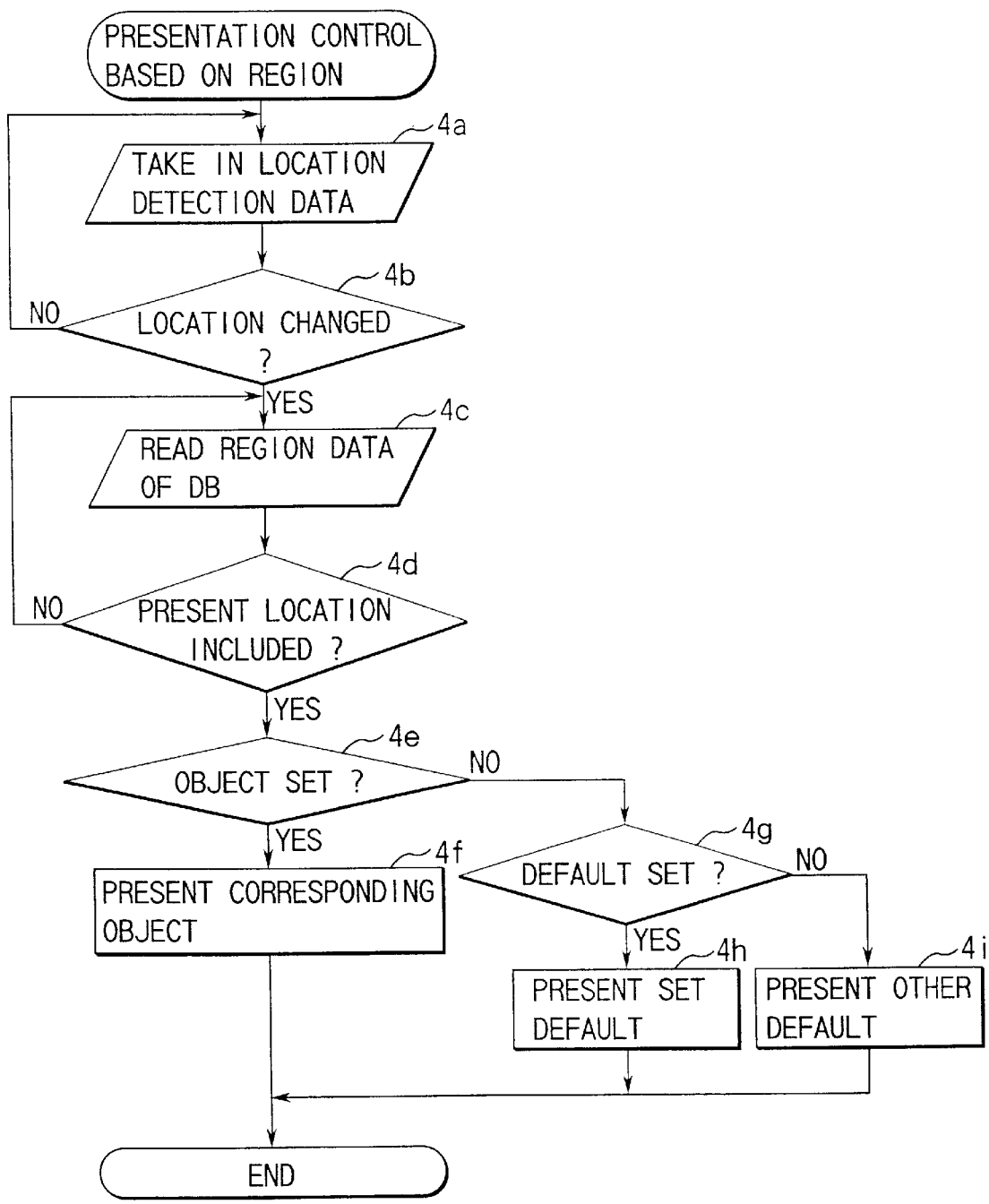
FIG. 4 is a flowchart showing a procedure and contents of data presentation by the terminal device shown in FIG. 3.

The object presentation operation carried out by the terminal device having the above-described structure will now be described. FIG. 4 is a flowchart indicating its controlling procedure and the control contents.

During an operation of receiving a broadcast signal, the synthesizing unit 50A takes in location detection data LD from the location detecting unit 63 periodically by Step 4b. Then, each time new location detection data LD is taken in, the new data is compared received by the GPS signal receiving unit 62 through an antenna 61. Then, the received signal is input to a location detecting unit 63. The location detecting unit 63 obtains a coordinate location of the self device on the basis of the ranging signals which came from the GPS satellites GS1, GS2, . . . , and a location detection data LD is input to the above-described synthesizing unit 50A.

Further, the terminal data has a location judgment database (location judgment DB) 55A. In the location judgment database 55A, type data of objects to be presented are stored to be associated with regions within a service area. FIG. 5 shows an example thereof, in which objects are managed as categorized into default data and setting data. Of these, the default data is data already written at the time of shipment of the terminal device 40. The setting data can be set arbitrarily by an operator of the terminal by operating a key input unit which is not shown.

The synthesizing unit 50A has presentation control means 51A and database renewal controlling means 52A as new functions according to the present invention.

The presentation control means 51A compares the location detection data LD given from the location detecting unit 63, that is, the present location of the terminal device 40, with regions stored in the location judgment database 55A. When a region which includes with the location detection data LD taken in at one previous time in Step 4b, and from the comparison result, it is judged if the self device has moved for a predetermined amount or more. When it has moved for a predetermined amount or more, the operation moves onto Step 4c, where the location judgment database 5 is searched to judge whether or not the region including the present location of the self device is registered.

If the result of the judgment indicates that the region including the present location of the self device is registered in the location judgment database 5, the operation of the synthesizing unit 50A moves onto Step 4e, where setting objects corresponding to the above-described corresponding region are read out so as to judge whether or not objects are stored. When a setting object is stored, the objects are selected from a plurality of received objects input from the selecting unit 49, and thus selected objects are synthesized in accordance with the scene description analysis data SC, to be supplied to the display 53 or the speaker, or both of these.

For example, when the present location of the self device is a region "Tokyo", a setting object "Tokyo1:Image 1" is read out as shown in FIG. 5, and objects corresponding to the setting object are selected from a plurality of objects received. Thus selected objects are synthesized in accordance with the scene description analysis data SC, and then supplied to the display 53 to be displayed.

On the contrary, when the setting object is not registered, the operation moves onto Step 4g, where it is judged whether or not default data of object corresponding to the location judgment database 55A are registered. If registered, the default data are synthesized in accordance with the scene description analysis data SC in Step 4h, to be supplied to the display 53 or the speaker, or both of these. Or if the default data are not registered, other default data are read from the location judgment database 55A, and supplied to the display 53 or the speaker, or both of these.

As described above, in the terminal device 40, an object corresponding to the region which includes the present location of the device is selected to follow to the movement thereof, and displayed on the display 53 or output from the speaker 54. With this operation, the terminal user becomes able to obtain data corresponding to the region where the user is present, at all times. Further, the contents of the location judgment database 55A can be revised arbitrarily, that is, data may be added or deleted, by key operation carried out on the terminal device, and therefore the terminal user becomes able to freely designate a region to each object in accordance with the desire of the user.

Meanwhile, let us suppose that database renewal data which uses scene description data comes from the transmitting station 10 during an operation. In this case, the synthesizing unit 50A carries out a renewal operation of the location judgment database 55A in accordance with the received database renewal data.

For example, let us suppose that the database renewal data as shown in FIG. 6 is received when the location judgment database 55A is structured as shown in FIG. 5. In this case, in the location judgment database 55A, the revision of the setting object corresponding to region "Tokyo", the addition of a region "Kawasaki" and its object, and the deletion of a region "Yokohama" are carried out. FIG. 7 shows a version of the location judgment database after the renewal.

With the above-described structure, it becomes possible to renew the contents of the location judgment database 55A of each terminal device 40 from the transmitting station 10 side in reply to, for example, the addition or deletion of a new region or the revision of a program, or the like.

It should be noted that as the means for detecting the location of the terminal device 40 itself, a type which detects its location by detecting a base station ID transmitted from a PHS (personal handy phone system) base station, or the like can be utilized, other than that utilizes a GPS satellite.

Further, region data corresponding to the present location of the terminal device may be displayed on the display 53 on the basis of location detection data LD obtained by a location detecting unit 63 and the region data registered in the location judgment database 55A, or when the region is switched along with the movement of the terminal device, message data indicating such may be displayed on the display 53. Further, in this case, the message data may be output from the speaker 54 as a voice message.

(Second Embodiment)

According to the second embodiment of the present invention, on a terminal device carried in an automobile, a running state judgment database which stores setting data indicating the corresponding relationship between the running state of the self device and the object to be presented, is provided. The running state of the self device is detected on the basis of the speed data or the like of the automobile, and appropriate objects are selected from a plurality of objects received and decoded, on the basis of the running state detection data and the setting data stored in the running state judgment database, and synthesized to be output to the display or speaker.

Figure 8:
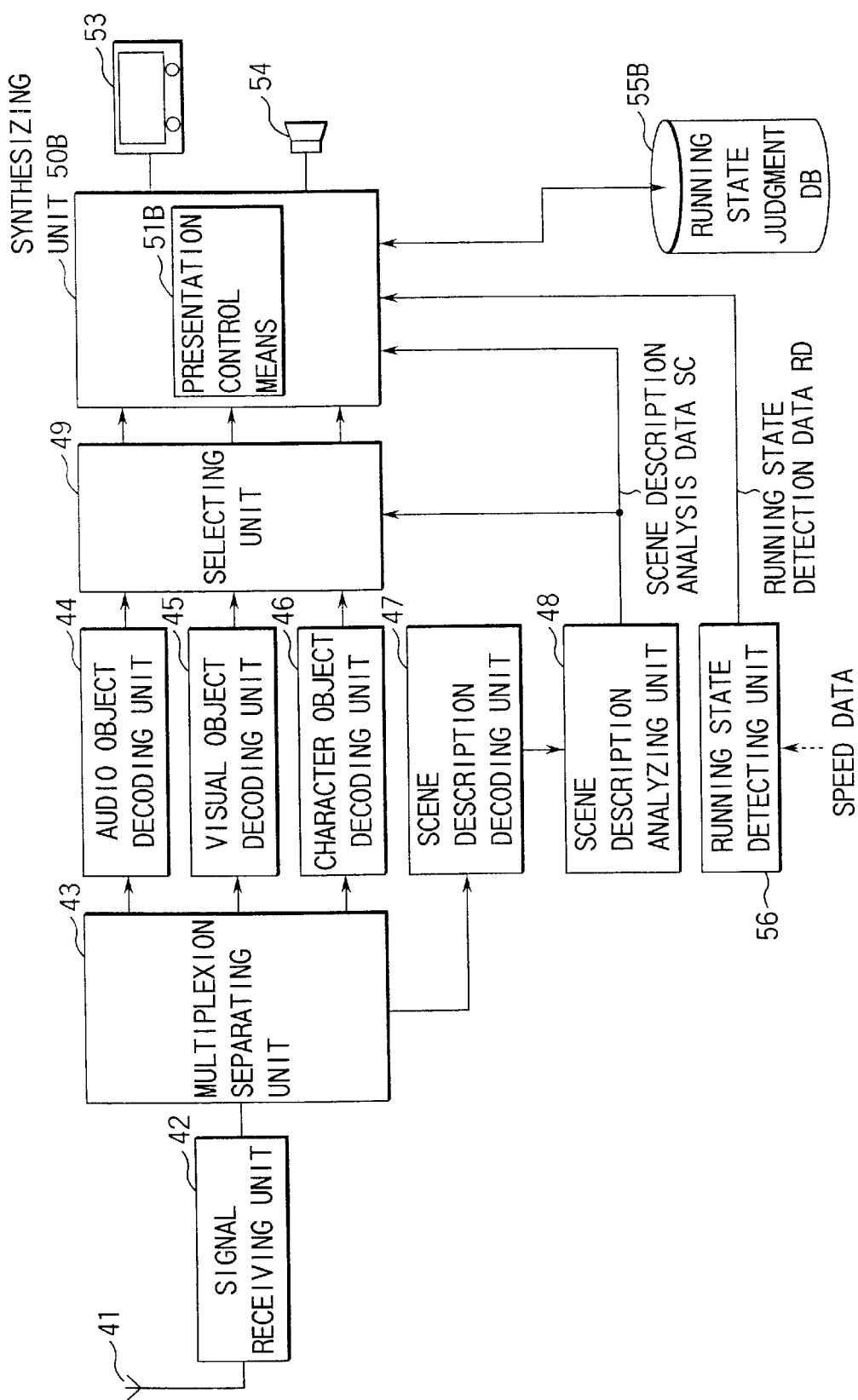
FIG. 8 is a circuit block diagram showing a structure of a terminal device according to the second embodiment of the present invention.

FIG. 8 is a block diagram showing the structure of a terminal device carried in an automobile, according to the second embodiment. It should be noted that structural elements shown in this figure, which are similar to those shown in FIG. 3 are designated by the same reference numerals, and detailed descriptions therefor will be omitted here.

In the terminal device of this embodiment, a running state judgment database 55B is provided. In the running state judgment database 55B, identification data (object ID) of objects to be presented are stored as they are associated respectively with the running states of the self device, that is, it is running or standing still. FIG. 10 shows an example thereof, in which objects are managed as they are divided into default data and filtering data. Of these, the default data are data already written at the time of shipment of the terminal device 40. The filtering data can be arbitrarily set by the operation of a key input unit which is not shown, carried out by the terminal user.

The terminal device of this embodiment is equipped with a running state detection unit 56. The running state detecting unit 56 serves to judge if the self device is running or standing on the basis of a speed detection signal output from a speed detector of the automobile, and then supplies the result of the judgment to the synthesizing unit 50B as running state detection data RD.

The synthesizing unit 50B includes a presentation control means 51B. The presentation control means 51B accesses the running state judgment database 55B using the running state detection data RD as a key, output from the running state detection unit 56, and read out object type data corresponding to the detected running state. Then, from a plurality of received objects input from the selecting unit 49, those which match the object type are selected, and the selected objects are synthesized in accordance with the scene description analysis data SC, and then supplied to the display 53 or the speaker 54, or both of them.

Figure 9:
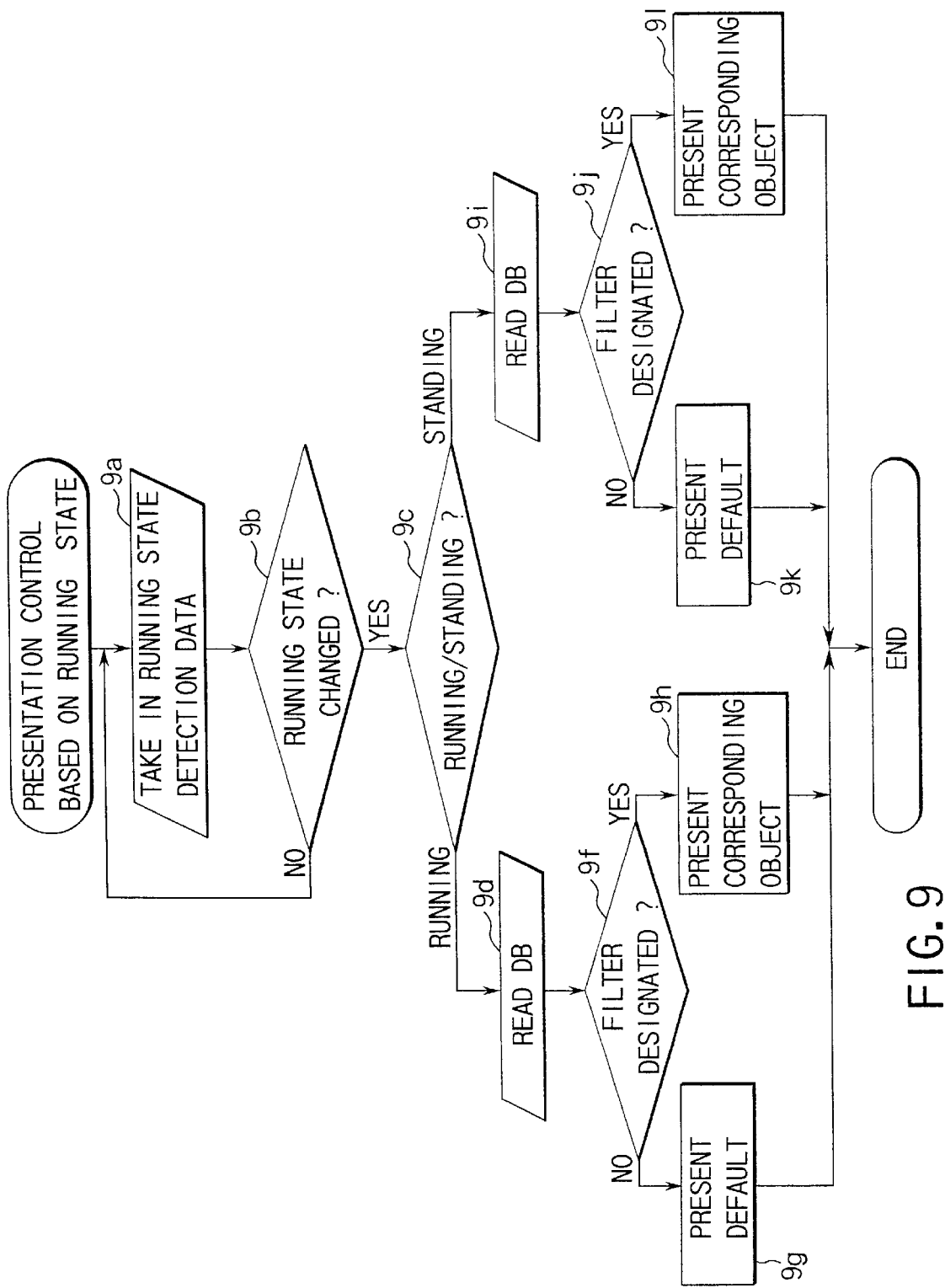
FIG. 9 is a flowchart showing a procedure and contents of data presentation by the terminal device shown in FIG. 8.

With the above-described structure, the following object presentation operation is carried out in the terminal device according to this embodiment. FIG. 9 is a flowchart indicating the control procedure and contents thereof.

While receiving a broadcast signal, the synthesizing unit 50B takes in running state detection data RD from the running state detecting unit 56 periodically in Step 9a. Then, each time the running state detection data RD is taken in, it is judged in Step 9b, whether or not the detection data RD has varied as compared to one previously taken detection data. When it is detected that the running state has varied from "running" to "standing", or "standing" to "running", the operation moves on to Step 9c, where the present running state is judged to be either one of them.

When the result of the judgment indicates that the present running state is "running", the synthesizing unit 50 moves onto Step 9d, where filtered objects are read out from the running state judgment database 55B, and are judged whether or not they are designated to filtering. If they are designated to filtering, in Step 9h, those which correspond to the objects designated to filtering are selected from a plurality of received objects input from the selecting unit 49, and the selected objects are synthesized in accordance with the scene description analysis data SC, and then supplied to the display 53 or the speaker 54, or both of them.

Or if not designated to filtering, in Step 9g, the default data are read out, and those objects corresponding to the default data are selected from a plurality of received objects input from the inputting section 49, and the selected objects are synthesized in accordance with the scene description analysis data SC, and then supplied to the display 53 or the speaker 54, or both of them.

In the meantime, let us suppose now that the running state of the self device is in "standing". In this case, the synthesizing unit 50 moves from Step 9c onto Step 9i, where filtered objects are read out from the running state judgment database 55B, and are judged whether or not they are designated to filtering. If they are designated to filtering, in Step 9l, those which correspond to the objects designated to filtering are selected from a plurality of received objects input from the selecting unit 49, and the selected objects are synthesized in accordance with the scene description analysis data SC, and then supplied to the display 53 or the speaker 54, or both of them.

Or if not designated to filtering, in Step 9k, the default data are read out, and those objects corresponding to the default data are selected from a plurality of received objects input from the inputting section 49, and the selected objects are synthesized in accordance with the scene description analysis data SC, and then supplied to the display 53 or the speaker 54, or both of them.

For example, if the running state of the self device is in "running", audio objects are selected from a plurality of received objects in the synthesizing unit 50B since "voice" is stored in the database 55B as objects designated to filtering, and the selected objects are synthesized in accordance with the scene description analysis data SC, and then output loud from the speaker 54.

Therefor, during running, of the scene data, only the audio objects are output from the speaker 54, images or texts are not at all displayed on the display 53. Therefore, the user does not take a look at the display 53 during running, thus making it possible to drive safely.

Meanwhile, during standing, visual objects and text objects are displayed on the display 53, and the audio object is output from the speaker 54. Therefore, if the automobile is stopped, the user is able to see and hear the scene data which includes all the objects.

It should be noted that the selection of an object during running is fixed only to the audio object, persons sitting in the passenger's seat or back seat can no longer see images or texts during running. Thus, as the user carries out a mode switching operation using the key input portion, image objects and text objects may be displayed on the display 53 during running as an alternative.

Further, during running, it is possible that text objects are converted into audio objects by a sound synthesizing technique, to output it from the speaker 54. With this structure, text objects such as headline news, traffic information, and weather forecast can be informed to the terminal user by reading them in voice, and thus the terminal user becomes able to know the contents of the text objects during running.

In the case where music and audio objects of a personality are already present when the audio objects generated by the voice synthesis are output from the speaker 54, these sound objects already present should be decreased in sound volume and then synthesized, to be finally output as sound. Further, in the case of a stereo-compatible speaker system, the audio object generated by the voice synthesis is output from one channel (for example, the right channel on the driver's seat side), and the already present audio object is output from the other channel (the left channel on the passenger's seat), to carry out channel separation. Further, when outputting the objects, the sound volume of the right channel should be made relatively larger than the volume of the left channel. With this structure, the terminal user becomes able to hear the voice synthesis object corresponding to the text more clearly.

(Third Embodiment)

According to the third embodiment of the present invention, the terminal device is provided with a presentation type judgment database which stores setting data indicating the corresponding relationship between the type of a presentation device being engaged and used, and objects to be presented. Before the receiving of a broadcast signal, type of the terminal device being used by connection is identified, and on the basis of the result of the judgment of the type and the setting data stored in the presentation type judgment database, appropriate objects are selected from a plurality of objects received and decoded, and synthesized, so as to be output to a display or speaker, serving as a presentation device.

Figure 12:
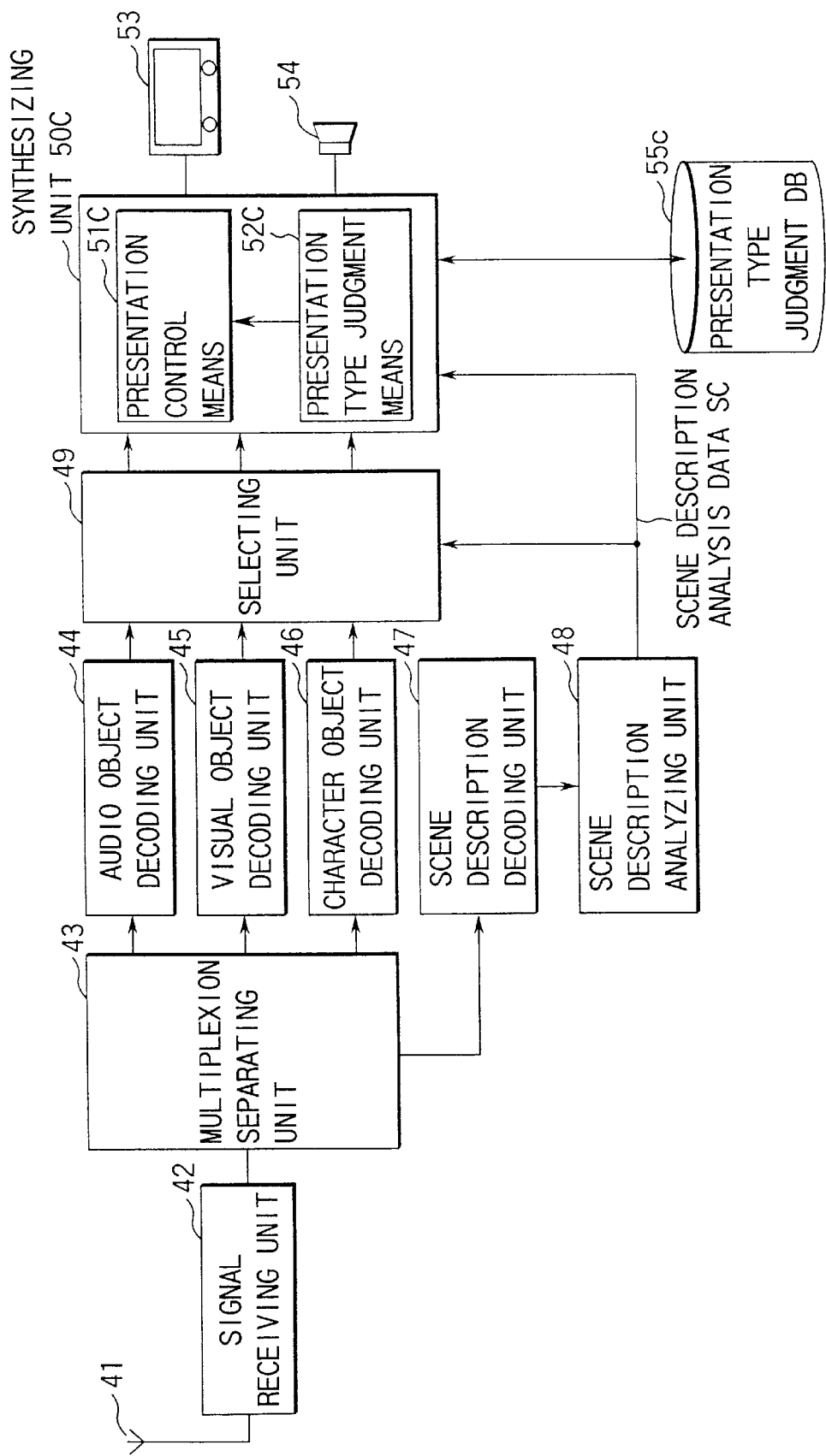
FIG. 12 is a circuit block diagram showing a structure of the terminal device according to the third embodiment of the present invention.

FIG. 12 is a block diagram showing the structure of a terminal device according to the third embodiment. It should be noted that structural elements shown in this figure, which are similar to those shown in FIG. 3 are designated by the same reference numerals, and detailed descriptions therefor will be omitted here.

In the terminal device of this embodiment, a presentation type judgment database 55C is provided. In the presentation type judgment database 55C, identification data (object ID) of objects to be presented are stored as they are associated respectively with the type of the self device being used by connection, that is, the speaker, a low-resolution display or high-resolution display. FIG. 11 shows an example thereof.

The synthesizing unit 50C comprises presentation control means 51C and presentation type judgment means 52C. The presentation type judgment means 52C judges the type of a presentation device being connected to the synthesizing unit 50C, that is, if the display 53 is connected or the speaker 54 is connected is judged, and further it the display is connected, it is judged if its specification is at high resolution or low resolution.

The presentation control means 51C accesses the presentation type judgment database 55C using the judgment result of the presentation type judgment database 55C as a key, and presentable objects are recognized, in order to present received objects. Then, from a plurality of received objects input from the selecting unit 49, those which match the presentable object are selected, and the selected objects are synthesized in accordance with the scene description analysis data SC, and then supplied to the display 53 or the speaker 54, or both of them.

Figure 13:
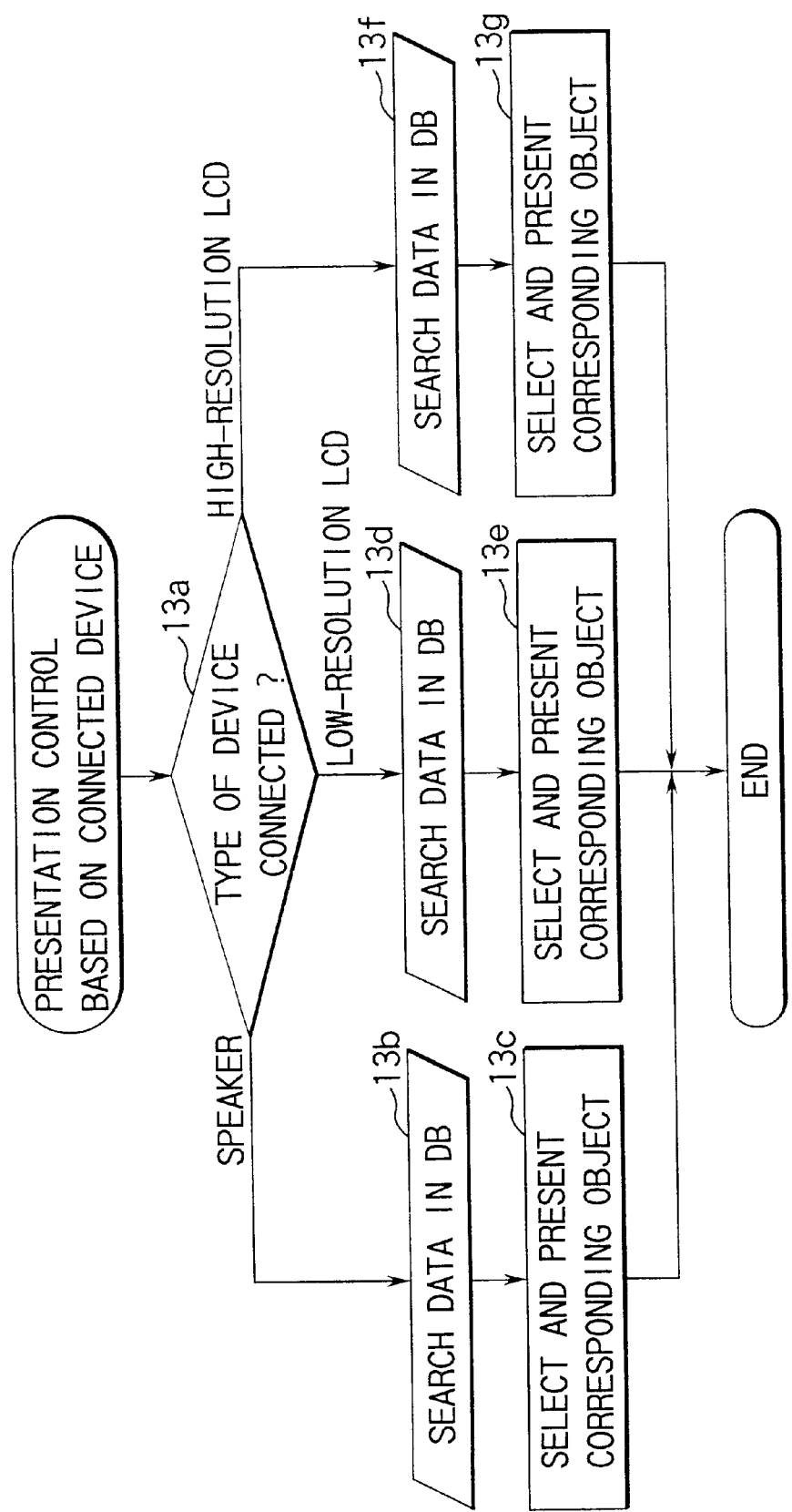
FIG. 13 is a flowchart showing a procedure and contents of data presentation by the terminal device shown in FIG. 12.

With the above-described structure, the following object presentation operation is carried out in the terminal device according to this embodiment. FIG. 13 is a flowchart indicating the control procedure and contents thereof.

Prior to the reception of a broadcast signal, the synthesizing unit 50C judges the type of the terminal device which is connected to be made usable in Step 13a. If the result of the judgment indicates that the presentation type is a speaker 54, then the operation moves onto Step 13b, a corresponding object, that is, "voice" is read out from the presentation type judgment database 55C. Further, in Step 13c, only audio objects are selected from a plurality of receiving objects input from the selecting unit 49, and when there are a plurality of selected audio objects, these are synthesized in accordance with the scene description analysis data SC, and then supplied to the speaker 54, to output sound.

On the other hand, if the presentation type is the low-resolution display, the operation moves onto Step 13d, where a corresponding object, that is, "text" is read out from the presentation type judgment database 55C. Further, in Step 13e, the text object is selected from a plurality of received objects input from the selecting unit 49. When there is a plurality of text objects selected, these are synthesized in accordance with the scene description analysis data SC, and then supplied to the low-resolution display 53 to display it.

It should noted that when the speaker 54 is connected as a presentation device, the operation moves onto Step 13d, where the synthesizing unit 50C selects the audio object from a plurality of received objects input from the selecting unit 49. When these audio objects selected, are synthesized in accordance with the scene description analysis data SC, and then supplied to the speaker 54 to output sound.

Further, when the presentation type is a high-resolution display 53, the operation moves onto Step 13f, where corresponding objects, that is, "image" and "text" are read out from the presentation type judgment database 55C. Further, in Step 13g, the visual object and text object are selected from a plurality of received objects input from the selecting unit 49, and thus selected visual objects and text objects are synthesized in accordance with the scene description analysis data SC, and then supplied to the low-resolution display 53 to display it.

It should noted that when the speaker 54 is connected as a presentation device, the synthesizing unit 50C selects the audio object from a plurality of received objects input from the selecting unit 49, and these audio objects selected are synthesized in accordance with the scene description analysis data SC, and then supplied to the speaker 54 to output sound.

According to the third embodiment, an object which is compliance with the type of the presentation device being used by connection is automatically selected and to be presented by the presentation device, and thus an appropriate object presentation in accordance with the type of the presentation device can be performed at all times.

It is possible that the judgment result of the presentation type judgment means 52C is displayed on the display 53. With this operation, in the case where the low-resolution mode is set although the display 53 has a high-resolution mode, for example, the terminal user is able to revise the setting to the high-resolution mode after the present mode is monitored.

(Fourth Embodiment)

According to the fourth embodiment of the present invention, in the transmitting station, scene description data are transmitted with region designation data added thereto, which is to designate the region of presentation of each object. In the terminal device, ranging signals transmitted by a plurality of GPS satellites are received to detect the location of the self device, and on the basis of the location detection data and the region designation data contained in the scene description data, objects corresponding to the present location of the self device are selected from a plurality of objects received and decoded. Further, thus selected objects are synthesized, so as to be output to a display or speaker.

Figure 14:
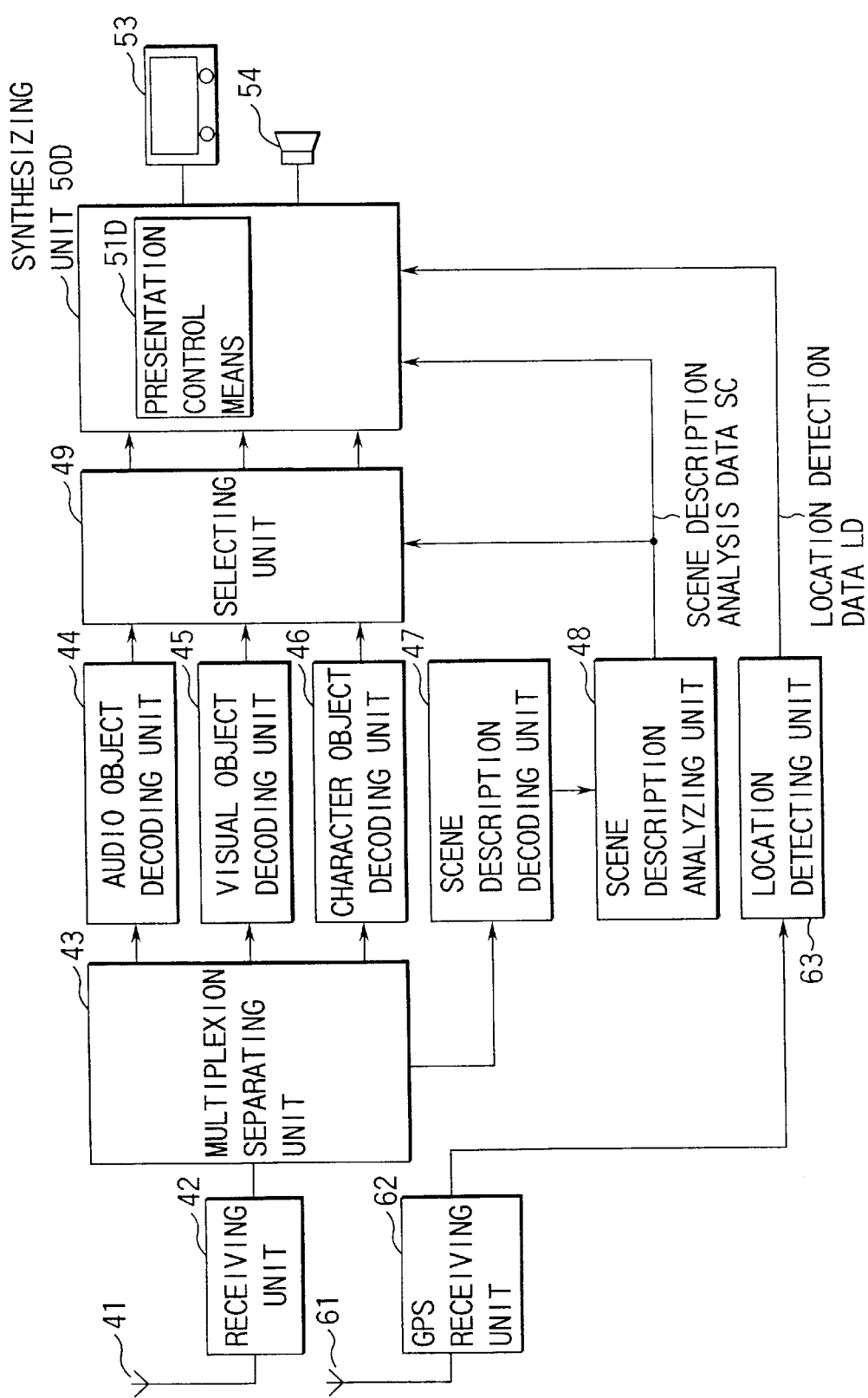
FIG. 14 is a circuit block diagram showing a structure of a terminal device according to the fourth embodiment of the present invention.

FIG. 14 is a block diagram showing the structure of a terminal device according to the fourth embodiment. It should be noted that structural elements shown in this figure, which are similar to those shown in FIG. 3 are designated by the same reference numerals, and detailed descriptions therefor will be omitted here.

The terminal device includes a GPS signal receiving unit 62, by which ranging signals transmitted by GPS satellites GS1, GS2, are received through antenna 61. Further, the received signals are input to the location detecting unit 63. The location detecting unit 63 obtains a coordinate location of the self device on the basis of the ranging signals transmitted from the GPS satellites GS1, GS2, . . . , and inputs it location detection data LD to the synthesizing unit 50D.

The synthesizing unit 50D comprises presentation control means 51D. The presentation control means 51D compares location detection data LD given from the location detecting unit 63, that is, data indicating the present location of the terminal device 40, with region designation data contained in the scene description analysis data given from the scene description analysis unit 48. Then, objects which has been subjected to the region designation corresponding to the present location are selected from a plurality of received objects input from the selecting unit 49, and thus selected objects are synthesized in accordance with the scene description analysis data SC, to be supplied to the display 53 or the speaker, or both of these.

Figure 15:
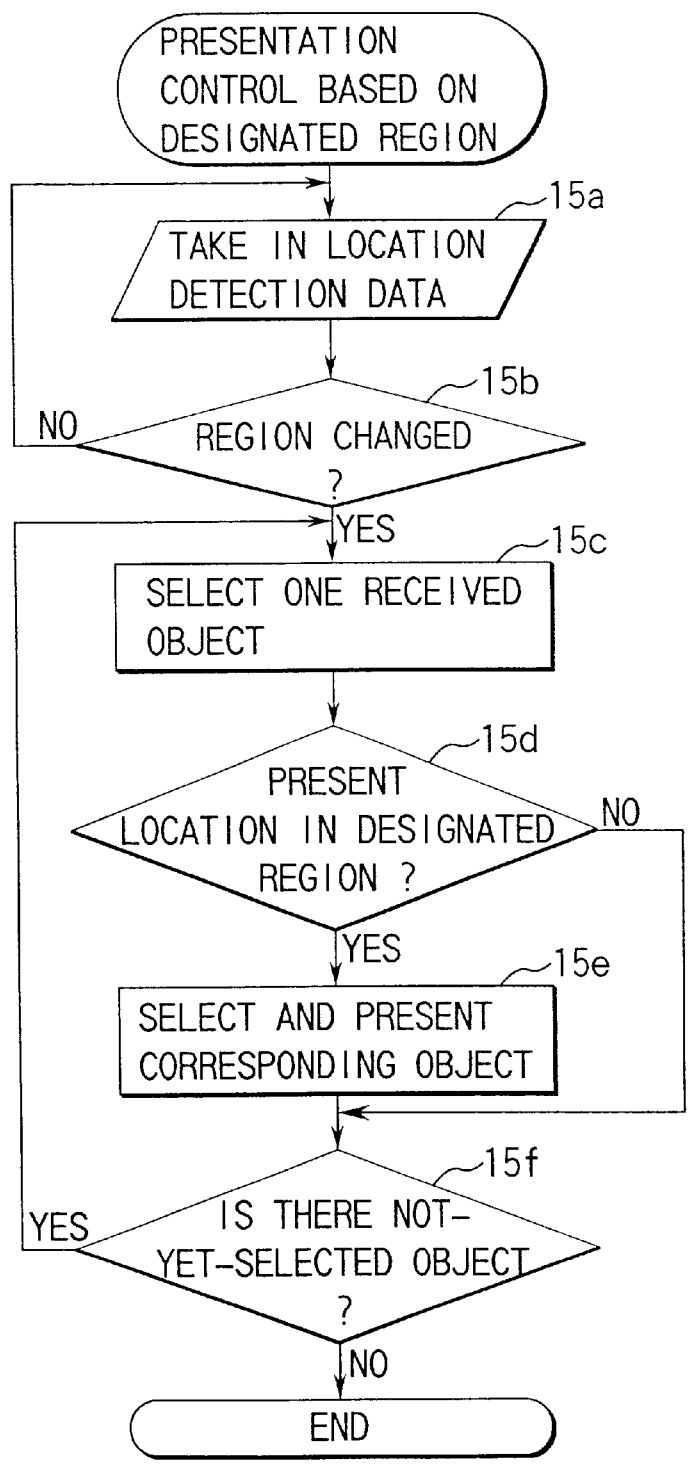
FIG. 15 is a flowchart showing a procedure and contents of data presentation by the terminal device shown in FIG. 14.

The object presentation operation carried out by the terminal device having the above-described structure will now be described. FIG. 15 is a flowchart indicating its controlling procedure and the control contents.

During an operation of receiving a broadcast signal, the synthesizing unit 50D takes in location detection data LD from the location detecting unit 63 periodically by Step 15a. Then, each time new location detection data LD is taken in, the new data is compared with the location detection data LD taken in at one previous time in Step 15b, and from the comparison result, it is judged if the self device has moved for a predetermined amount or more. When it has moved for a predetermined amount or more, the operation moves onto Step 15c, where one received object is selected out of the scene description analysis data SC, and the region designation data added to be associated with the received object is compared with the present location of the self device in Step 15d. If the result of the judgment indicates that the present location of the self device located in the designated region, the operation moves onto Step 15e, where corresponding objects are selected from a plurality of received objects output from the selecting unit 49, as objects to be presented.

On the other hand, if the present location of the self device is judged to be not in the designated region in Step 15d, then the operation of the synthesizing unit 50 moves onto Step 15f, where it is judged whether or not not-yet-selected objects are remaining in the scene description analysis data SC. If remaining, the operation goes back to Step 15c, the not-yet-selected object is selected, and the process from the steps 15d to 15e is executed. Then, similarly, the above-described process is repeatedly carried out on every object included in the scene description analysis data SC. After that the objects selected in the above processing operations, as object to be presented are synthesized in accordance with the scene description analysis data SC, and they are supplied to the display 53 or the speaker, or both of these to present the objects.

Therefore, with this operation, only the objects which have been subjected to the designation of the region corresponding to the present location of the self device are selected out of a plurality of objects received and presented on the presentation device. For example, let us suppose now that scene description data as shown in FIG. 16 are sent from the signal transmitting station, and the present location of the self device is included in the designated region "Tokyo". In this case, in the synthesizing unit 50D, those objects which are designated as "TOKYO" by the region designation data, that is, "voice 1", "text 1" and "image 1" are selected, and these objects are synthesized in accordance with the scene description analysis data SC, and then displayed on the display 53 and output from the speaker 54, as sound.

With the above-described structure, in the terminal device 40, an object of a region which is not related to the present location of the self device will not be presented, and it becomes possible for the terminal user to obtain data corresponding to the present location of the self at all time. Further, in the embodiment, the designation of the region of each object is carried out on the signal transmitting station 10 side, and the revision of the designated regions, which becomes necessary to match the renewal of the object can be carried out in a batch on the signal transmitting station 10 side.

(Fifth Embodiment)

According to the fifth embodiment of the present invention, in the transmitting station, scene description data are transmitted while adding running state designation data thereto for each object, which is to designate whether or not it is to be presented in accordance with the running state of the terminal device. In the terminal device, the running state of the self device is detected on the basis of speed data and the like of the automobile, and on the basis of the running state detection data and the running state designation data included in the scene description data, appropriate objects are selected from a plurality of objects received and decoded. Further, thus selected objects are synthesized, so as to be output to a display or speaker.

Figure 18:
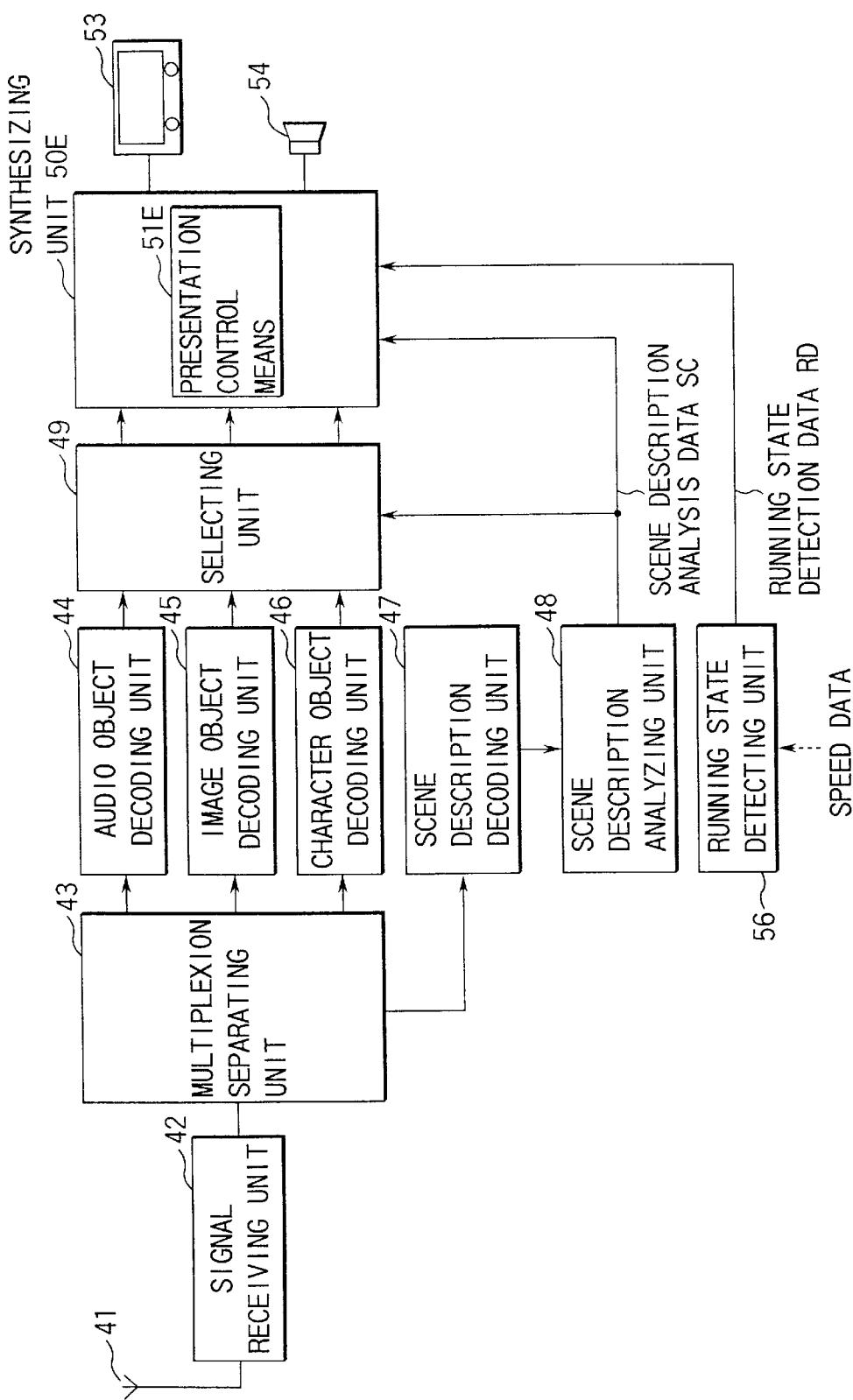
FIG. 18 is a circuit block diagram showing a structure of a terminal device according to the fifth embodiment of the present invention.

FIG. 18 is a block diagram showing the structure of a terminal device to be carried in a car, according to the fifth embodiment. It should be noted that structural elements shown in this figure, which are similar to those shown in FIG. 8 are designated by the same reference numerals, and detailed descriptions therefor will be omitted here.

The terminal device of this embodiment includes a running state detection unit 56, as in the case of the device shown in FIG. 8. The running state detecting unit 56 judges if the self device is running or standing on the basis of the speed detection signal output from the speed detector of the automobile, and supplies the result of judgment to a synthesizing unit 50E as running state detection data RD.

The synthesizing unit 50E comprises presentation control means 51E. The presentation control means 51E compares running state detection data RD given from the running state detecting unit 56, that is, data indicating if the terminal device 40 is in running or standing, with running state designation data contained in the scene description analysis data given from the scene description analysis unit 48. Then, objects corresponding to the present running state of the self device are selected from a plurality of received objects input from the selecting unit 49, and thus selected objects are synthesized in accordance with the scene description analysis data SC, to be supplied to the display 53 or the speaker 54, or both of these.

Figure 19:
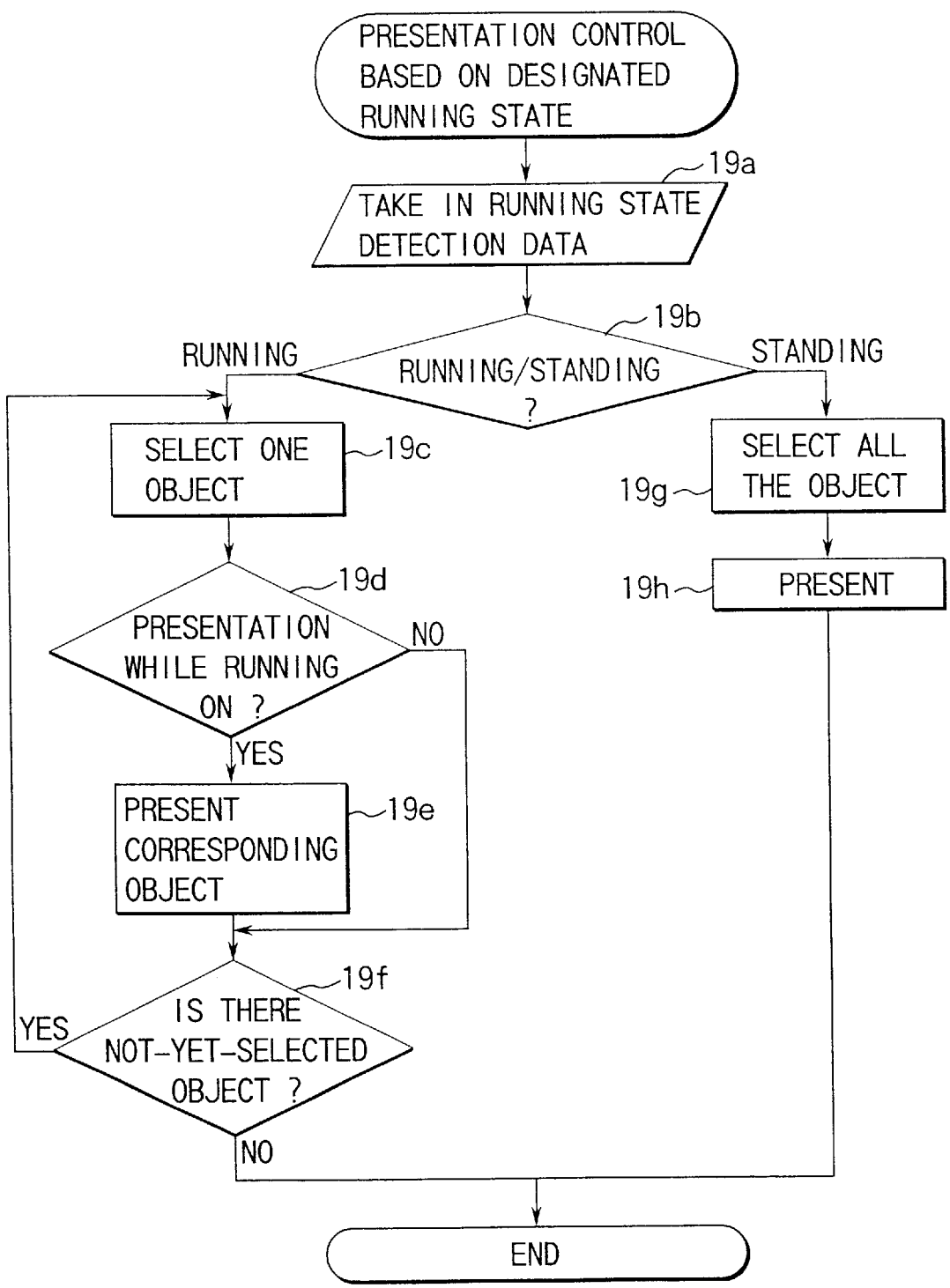
FIG. 19 is a flowchart showing a procedure and contents of data presentation by the terminal device shown in FIG. 18.

The object presentation operation carried out by the terminal device having the above-described structure will now be described. FIG. 19 is a flowchart indicating its controlling procedure and the control contents.

During an operation of receiving a broadcast signal, the synthesizing unit 50E takes in running state detection data RD from the running state detecting unit 56 periodically by Step 19a. Then, each time new running state detection data RD is taken in, it is judged if the running state of the self device is in "running" or "standing" on the basis of the detection data RD in Step 19b.

If the result of the judgment indicates that the self device is in "running state", the operation moves onto Step 19c, where one object is selected from the scene description data, and the running state designation data added to be associated with this object and the present running state of the self device are compared with each other in Step 19d. If the result of the comparison indicates that the running state designation data is "presentation is on while running", then the operation moves onto Step 19e, where corresponding object are selected as an object to be presented, out of a plurality of received objects, output from the selecting unit 49.

On the other hand, if the running state designation data is "presentation is off while running", then the operation moves onto Step 19f, where it is judged whether or not not-yet-selected objects are remaining in the scene description analysis data SC. If remaining, the operation goes back to Step 19c, one not-yet-selected object is selected, and the process from the steps 19d and 19e is executed. Then, similarly, the above-described process is repeatedly carried out on every object included in the scene description analysis data SC.

After that the objects selected in the above processing operations, as object to be presented are synthesized in accordance with the scene description analysis data SC, and they are supplied to the display 53 or the speaker, or both of these to present the objects.

Therefore, with this operation, only the objects which have been designated as "presentation while running permitted" are selected out of a plurality of objects received and presented on the presentation device. For example, let us suppose now that scene description data as shown in FIG. 17 are sent from the signal transmitting station. Then, in the synthesizing unit 50E, the object designated as "presentation while running permitted" by the running state designation data, that is, only "voice 1", are selected, and the audio object is output from the speaker 54, in accordance with the scene description analysis data SC, as sound.

With the above-described structure, in the terminal device 40, only the audio object is output as sound while the self device is running, and the image object or text object is not displayed. Therefore, it sets the terminal user free from having to monitor the display 53 while driving, and therefore safety drive can be achieved.

It should be noted if, in Step 19b, the running state of the self device is judged to be "standing", then the operation of the synthesizing 50E moves onto Step 19g, where all the objects received are selected, and the objects are synthesized in accordance with the scene description analysis data SC, to be supplied to the display 53 or the speaker, or both of these to present the objects. Therefore, as the terminal user stops the automobile, the scene data which contains all the objects can be seen and heard.

As described above, according to the fifth embodiment, the objects can be appropriately presented in accordance with the running state of the self device. Further, in the embodiment, the designation of the presentation which is in accordance with the running state of each object is carried out on the signal transmitting station 10 side, and the revision of the designated regions, which becomes necessary to match the renewal of the object can be carried out in a batch on the signal transmitting station 10 side.

(Sixth Embodiment)

According to the sixth embodiment of the present invention, in the transmitting station, scene description data are transmitted while adding presentation device type data thereto for each object, which is to indicate the type of the presentation device to be used. In the terminal device, before the reception of the broadcast signal, the type of the terminal device being used by connection is identified, and on the basis of the result of the judgment of the type and the presentation type judgment data contained in the scene description data received, objects corresponding to type of the presentation device which is being connected to be used, are selected from a plurality of objects received and decoded, and these objects are synthesized in accordance with the scene description data, so as to be output to a display or speaker, serving as a presentation device.

Figure 20:
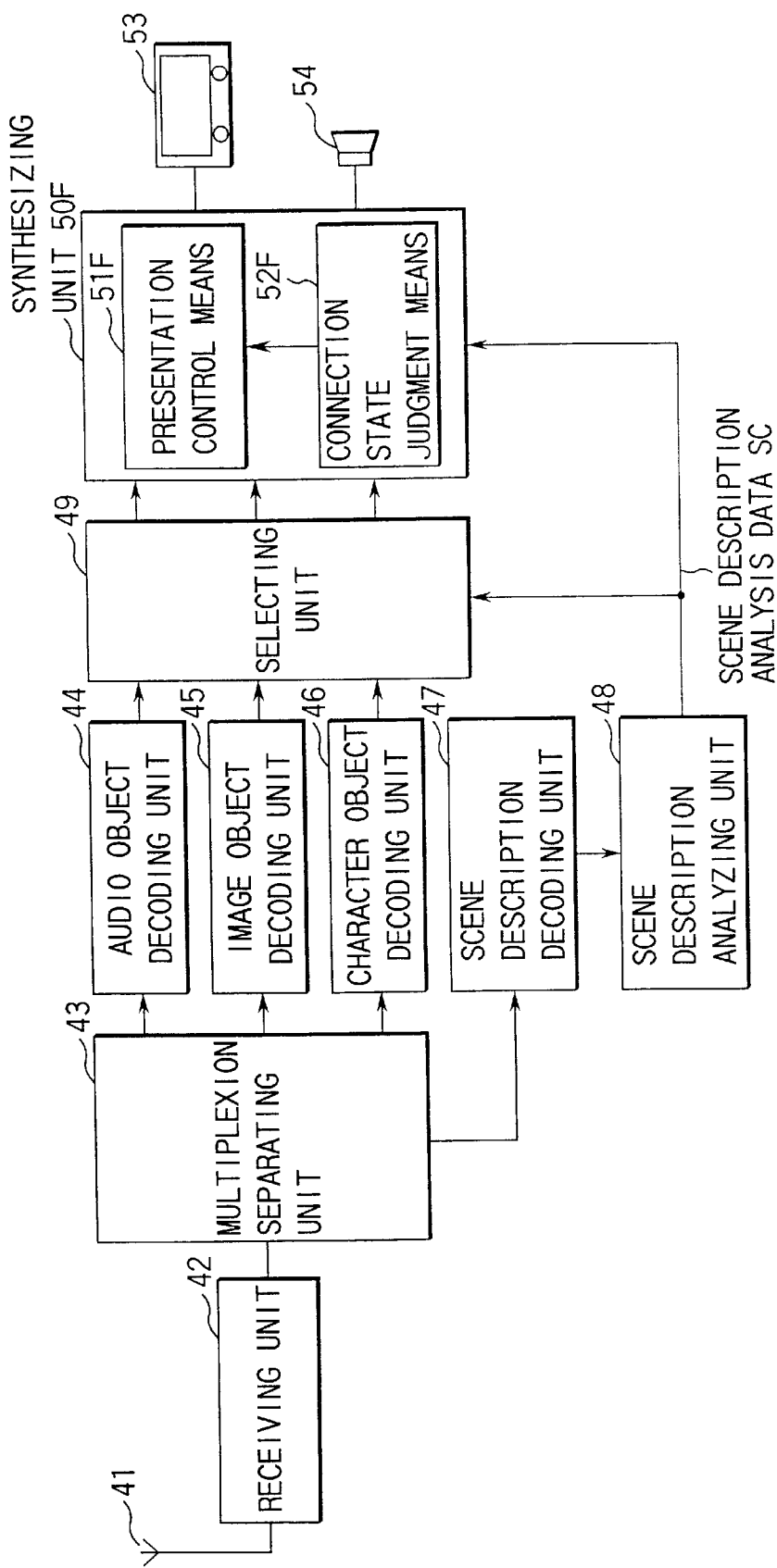
FIG. 20 is a circuit block diagram showing a structure of a terminal device according to the sixth embodiment of the present invention.

FIG. 20 is a block diagram showing the structure of a terminal device to be carried in car, according to the sixth embodiment. It should be noted that structural elements shown in this figure, which are similar to those shown in FIG. 1 are designated by the same reference numerals, and detailed descriptions therefor will be omitted here.

A synthesizing unit 50F comprises presentation control means 51F and presentation type judgment means 52F. The presentation type judgment means 52F judges the type of a presentation device being connected to the synthesizing unit 50F, that is, if a display 53 is connected or a speaker 54 is connected is judged, and further it the display 53 is connected, it is judged if its specification is at high resolution or low resolution.

When presenting received objects. The presentation control means 51F compares the judgment result of the presentation type judgment means with the presentation device type data contained in the scene description analysis data SC obtained by the scene description analysis unit 48. Then, on the basis of the result of the comparison, objects in compliance with the type of the presentation device presently connected to the self device, are judged, and from a plurality of received objects input from the selecting unit 49, those which match the object are selected, and the selected objects are synthesized in accordance with the scene description analysis data SC, and then supplied to the display 53 or the speaker 54.

Figure 21:
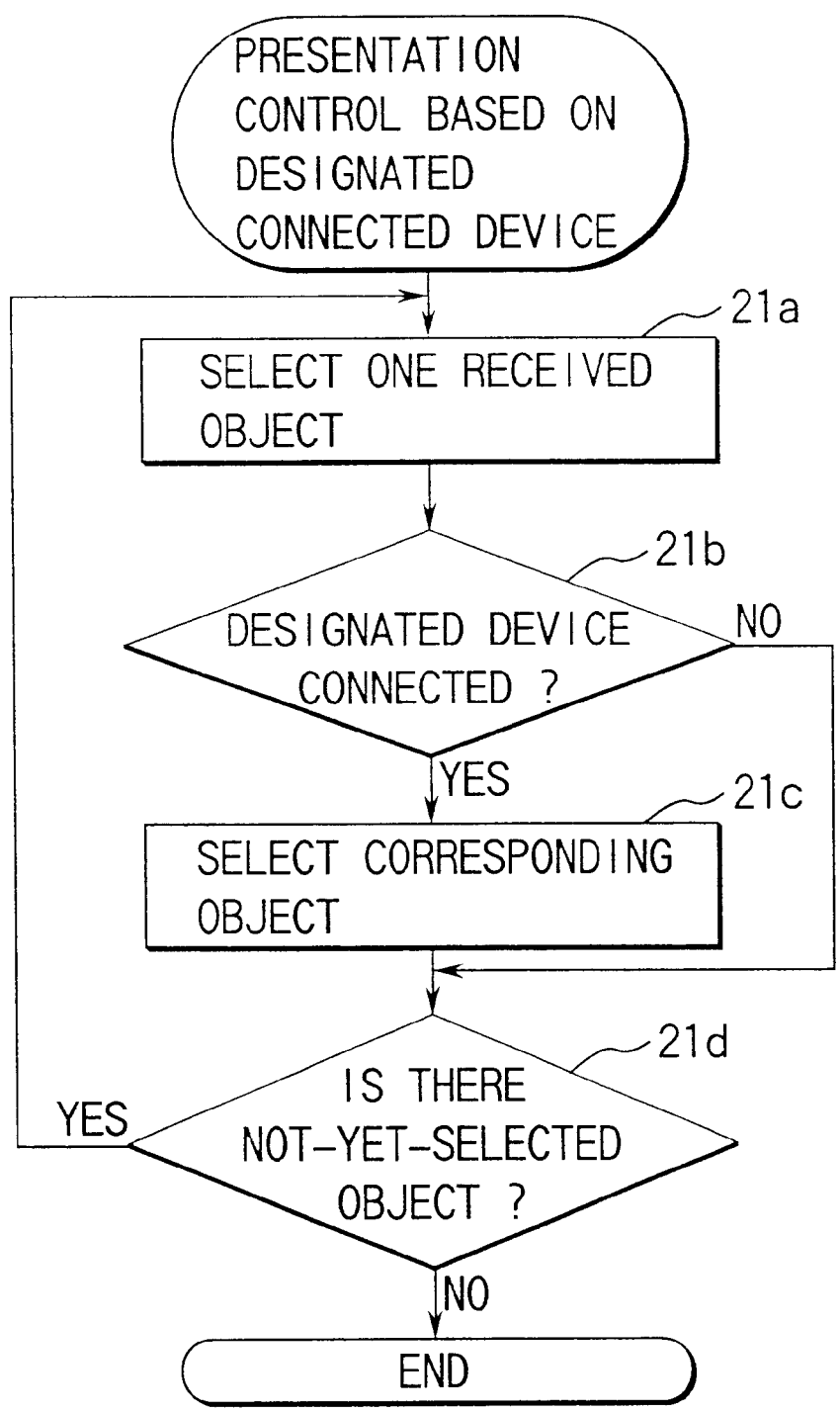
FIG. 21 is a flowchart showing a procedure and contents of data presentation by the terminal device shown in FIG. 20.

With the above-described structure, the following object presentation operation is carried out in the terminal device according to this embodiment. FIG. 21 is a flowchart indicating the control procedure and contents thereof.

Prior to the reception of a broadcast signal, the synthesizing unit 50F judges the type of the terminal device which is connected to be made usable. That is, if the display 53 is connected or the speaker 54 is connected is judged, and further if the display 53 is connected, it is judged if the specification is a high resolution or low resolution.

When a broadcast signal is received in the above-described state, the synthesizing unit 50F, in Step 21a, selects one object from the scene description analysis data SC output from the scene description analysis unit 48, and the type of the presentation device associated with this object is compared with the type of the presentation device of the self already judged in advance in Step 21b. If they match, those corresponding to the selected object are selected from a plurality of received objects output from the selecting unit 49 in Step 21c.

On the other hand, if the result of the comparison indicates that the type of the presentation device designated by the scene description data from the signal transmitting station 10 side, and the type of the presentation device connected to the self device do not match, the operation of the synthesizing unit 50F moves onto Step 21d, where it is judged whether or not not-yet-selected objects are remaining in the scene description analysis data SC. If remaining, the operation goes back to Step 21c, one not-yet-selected object is selected, and the process from the steps 21b and 21c is executed. Then, similarly, the above-described process is repeatedly carried out on every object included in the scene description analysis data SC.

After that, the objects selected in the above processing operations, as object to be presented are synthesized in accordance with the scene description analysis data SC, and they are supplied to the presentation device connected to the self device, to present the objects.

Let us suppose now that scene description data as shown in FIG. 22 is sent from the signal transmitting station 10 while the speaker 54 and the low-resolution display 54 are connected to the self device. In this case, the synthesizing unit 50F recognizes objects designated to types such as "speaker" and "low-resolution LCD", that is, "voice 1" and "text 1" by the presentation device type data. Further, out of a plurality of received objects output from the selecting unit 49, those received objects which correspond to the above-mentioned "voice 1" and "text 1" are selected respectively, and these received objects are synthesized in accordance with the scene description analysis data SC, and then supplied to the display 53 or the speaker 54.

Meanwhile, in the case where the speaker 54 and the high-resolution display are connected to the self device, out of a plurality of received objects output from the selecting unit 49, those received objects which correspond to the above-mentioned "voice 1", "text 1" and "image 1", that is, all the objects, are selected, and these received objects are synthesized in accordance with the scene description analysis data SC, and then supplied to the display 53 and the speaker 54.

It should be noted that in the case of a terminal device of a radio type having only a speaker, out of a plurality of received objects output from the selecting unit 49, the received object which corresponds to the "voice 1", that is, only the audio object, is selected, and output from speaker 53 as sound.

According to the sixth embodiment, objects which are in compliance with types of the presentation devices being used by connection are selected on the basis of the presentation device type data contained in the scene presentation data, and presented by the respective presentation devices. Therefore, an appropriate object presentation in accordance with the type of the presentation device can be performed at all times. Moreover, the designation of the type of the presentation device corresponding to a respective object is carried out on the signal transmitting station 10 side, and the revision of the designation of the type of the presentation device, which becomes necessary to match the renewal of the object can be carried out in a batch on the signal transmitting station 10 side.

(Seventh Embodiment)

Figure 23:
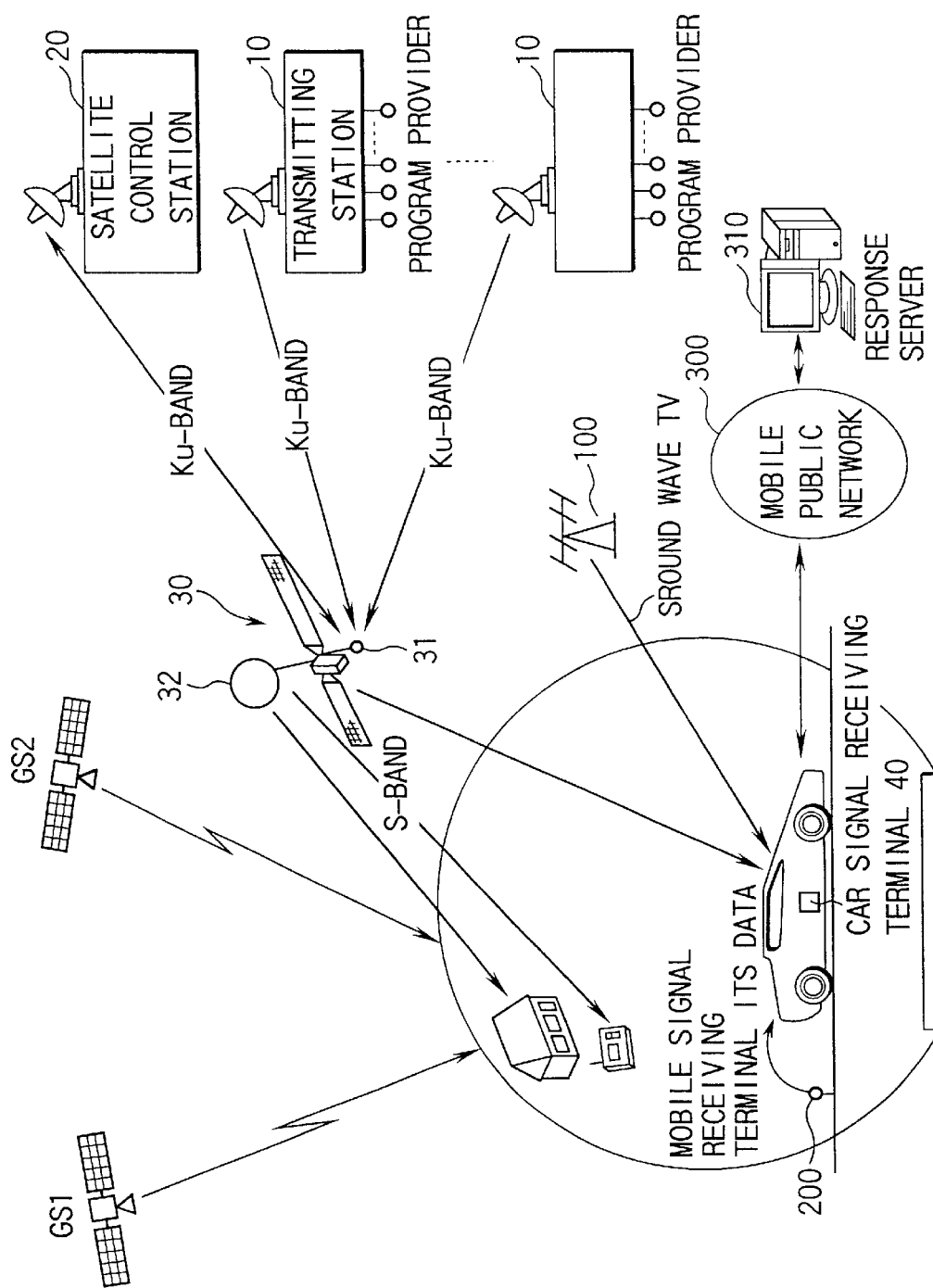
FIG. 23 is a schematic diagram showing the structure of a digital satellite broadcasting system according to the seventh embodiment of the present invention.

FIG. 23 is a schematic diagram showing a structure of a digital satellite broadcast system to which the seventh embodiment of the present invention is applied. It should be noted that structural elements shown in this figure, which are similar to those shown in FIG. 23 are designated by the same reference numerals, and descriptions therefor will not be repeated here.

In FIG. 23, an automobile equipped with a terminal device 40 comprises a GPS signal receiver for receiving GPS signals from GPS satellites (GS1, GS2) to obtain the present location of the self, a ground wave TV receiver for receiving a ground wave television broadcast from a ground wave television broadcast station 100, an ITS receiver for receiving ITS data from an ITS (Intelligent Transportation System), and a mobile communication device for carrying out communication by connecting to a response server 310 via a mobile public network 300.

Figure 24:
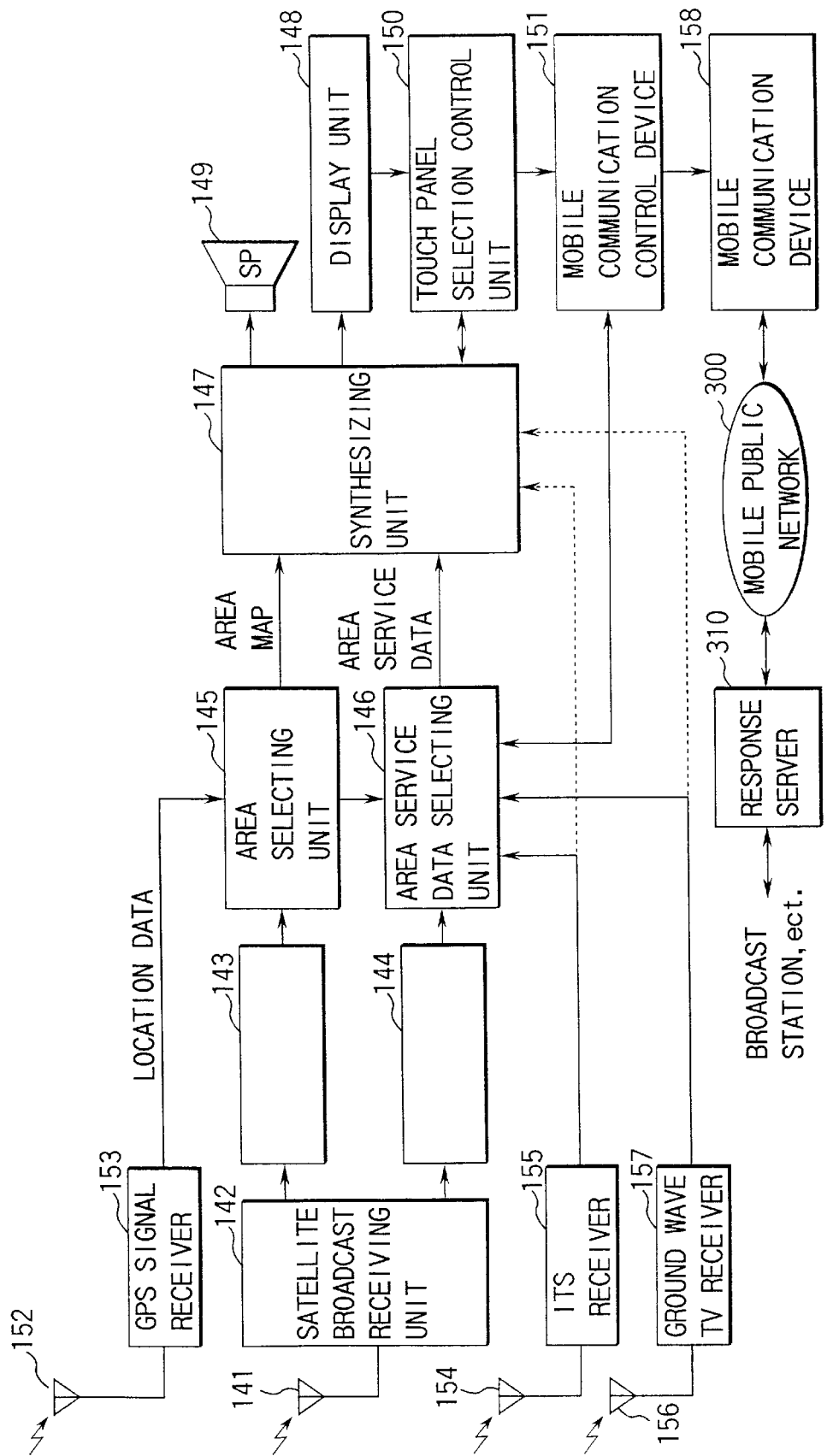
FIG. 24 is a block diagram showing a structure of a terminal device used in the seventh embodiment of the present invention, when it is mounted in a mobile station.

FIG. 24 shows a structure of the car-equipped terminal device 40. In FIG. 24, a satellite broadcast wave from a geostationary satellite 30 is received via an antenna 141 by a satellite broadcast receiving unit 142. The receiving unit 141 is capable of selecting at least two channels of broadcast services, one of which is sent to a first selection channel data processing unit 43, and the other is sent to a second selection channel data processing unit 144. The data processing units 143 and 144 are designed to decode the data of the selected broadcast services respectively, and the data obtained here are sent via an area selecting unit 145 and an area service data selecting unit 146, respectively, to a synthesizing unit 147, where they are integrated into one service data. Of the service data obtained here, image data is displayed on a display unit 148 and voice data is played acoustically by an audio playback unit 149.

A touch panel sensor (not shown) is provided on the display screen of the display unit 148, and a touch panel selection control unit 150 for instructing a data presentation to the synthesizing unit 147 from a sensor output by judging the designation data of the user is provided. When the designation data indicates the connection with the response server 310, the touch panel selection control unit 150 informs its user designation data to a mobile communication control device 151. During this period, the mobile communication control device 151 obtains address data of a communication opponent (response server 310) from the area service data selecting unit 146, and controls the mobile communication device 158 to make a connection with the response server 310. Thus, necessary data is downloaded or uploaded.

On the other hand, to the area selecting unit 145, the present location data obtained by the GPS receiver 153 via an antenna 152 is input. Further, to the area service data selecting unit 146, ITS data obtained by an ITS receiver 155 via an antenna 154, and program data of ground wave TV broadcast obtained by a ground wave TV receiver 157 via an antenna 156 are input. It should be noted that the ITS data and ground wave TV program data are, in some cases, input to the synthesizing unit 147.

In connection with the car-equipped signal receiving terminal device 40 having the above-described structure, integration of a plurality of broadcast services will now be described.

Let us suppose now that a broadcast service of map information is provided on one channel, whereas a local broadcast service of facilities and region is provided on another channel.

Here, in the broadcast service of map information, the map within the service area is divided like a mesh as shown in FIG. 25A (it may be circular zones), and the divided areas are referred to by area numbers (1 to N), so as to present it in a bitmap format as shown in FIG. 25. In the case, the range (region) of each divided area is designated by the upper left coordinates and the lower right coordinates, which are expressed by a north latitude and east longitude. FIG. 26 shows the types and contents of data at the respective divided area numbers (area No.) of the map information data. When a broadcast service which provides the map information is selected, it is decoded in the first channel data processing unit 143 and sent to the area selecting unit 145.

Figure 27:
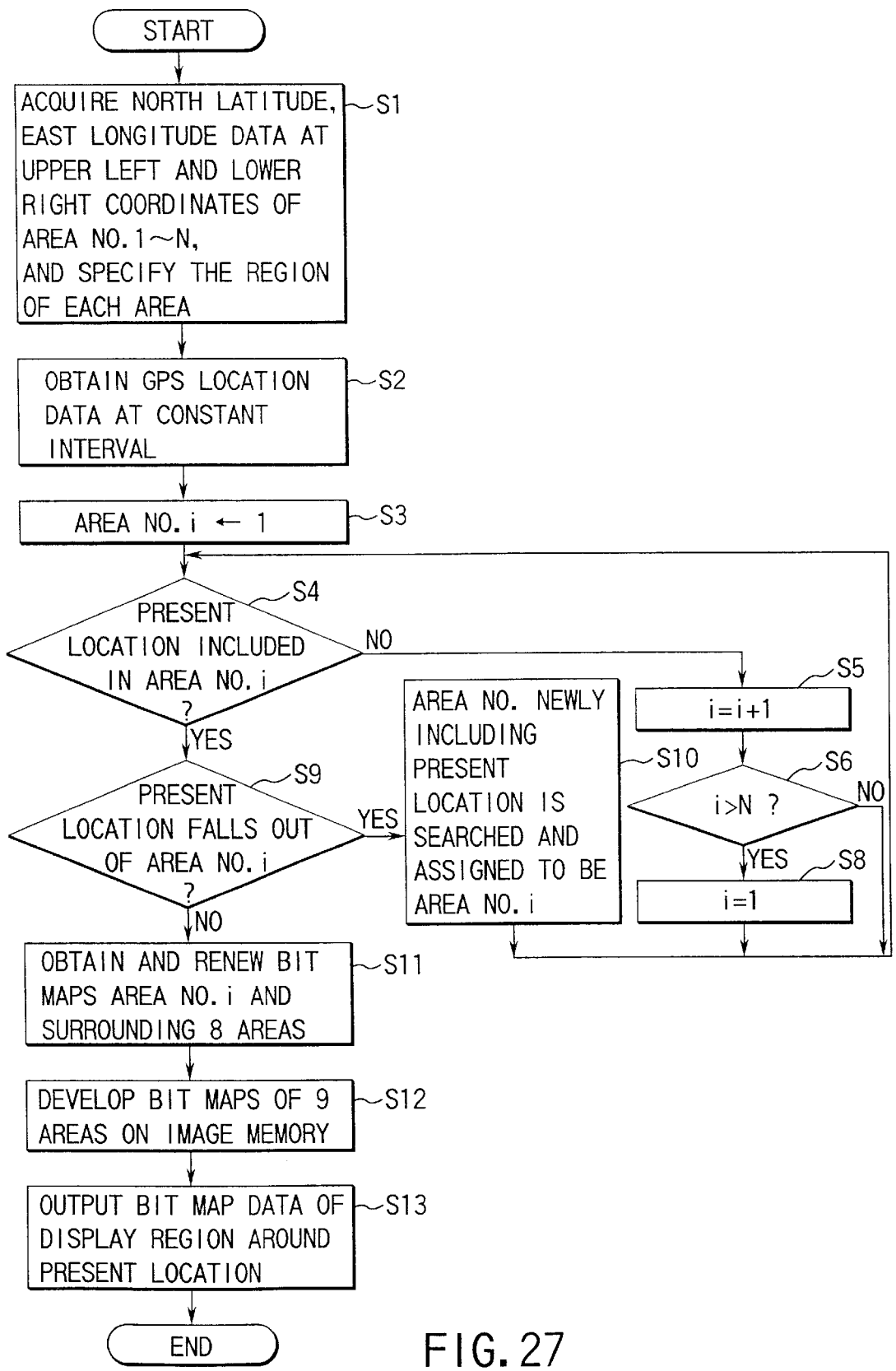
FIG. 27 is a flowchart illustrating the processing contents of an area selection section in the seventh embodiment of the present invention.
Figure 30:
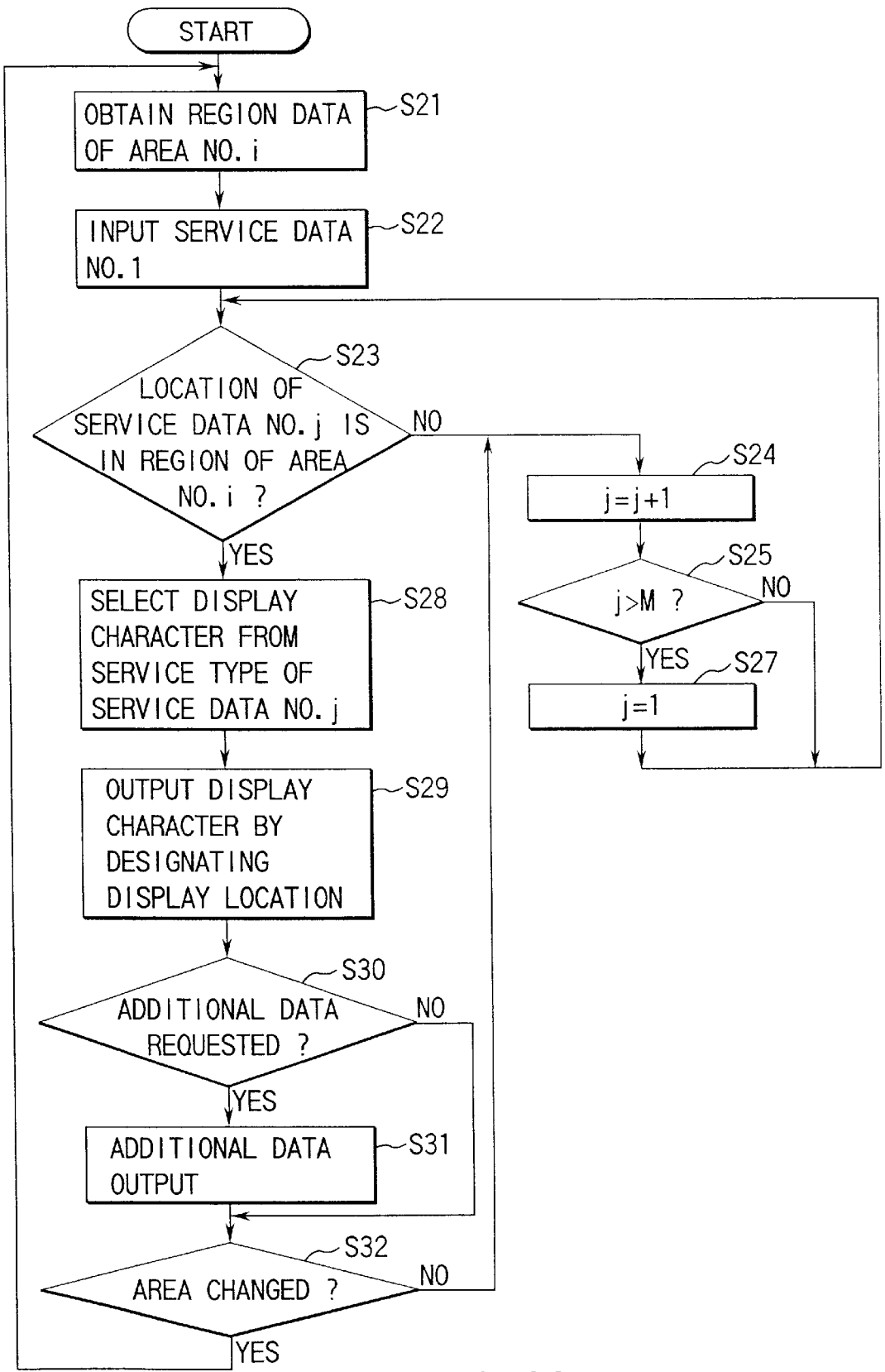
FIG. 30 is a flowchart illustrating the processing contents of a service area selection section within the area in the seventh embodiment of the present invention.

The processing contents of the area selecting unit 143 are shown in FIG. 27. First, from the map information, the north latitude and east longitude data of the lower right and upper left coordinates of each of the areas No.1 to N are obtained so as to specify the region of each area (S1). Then, GPS location data (present location) are obtained at certain intervals from the GPS receiver 153 (S2).

Next, an area No.1 is designated (S3), and it is judged if the present location is included in the area No.1 (S4). If not included, the subsequently area No. is designated to judge if the present location is included, and after that, until the area which contains the present location is found, the operation is repeated (S5 to S8). When the area which includes the present location is found, it is monitored if the present location falls out of the area (S9). If it falls out of the area, an area which presently includes the present location is searched (S10), and the operation moves on to the process of Step S4.

While the present location is included in the area, the area and the bitmap (map) of other 8 areas which surround that area are obtained and renewed (S11), and the bitmaps of the above 9 areas are developed on an internal image memory (S12). Thus, the bitmap data of the display region with respect to the present location being set at center is output (S13). Here, the reason why the bitmaps of not only the area which includes the present location but also the surrounding areas are obtained and renewed, is to be able to follow to the next display area immediately after the present location falls out of the display area between times t1 and t2 as the device-equipped automobile moves as shown in FIG. 28. Please note that an area No. i is directly displayed in order to simplify the explanation.

On the other hand, in the case where the location data and its additional data are, of movie theaters, convenience stores, gas stations, financial facilities, governmental facilities are provided in a hierarchical way, the data of the local broadcast service is decoded by the second channel data processing unit 144, and then sent to the intra-service data selecting unit 146.

Here, as local broadcast services, a number (No.) is assigned to each of the service data as shown in FIG. 29, and service type, location, title, address of response service, and additional data are prepared as types of service in accordance with necessity. For example, the contents of service No. 1 include a service type of movie theater, a location of north latitude oo degrees and east longitude xx degrees, a title of cinema 1, a server address of xx-xxxx-xxxx, and additional data of still image and voice, and the contents of service No. 2 include a service type of convenience store, a location of north latitude oo degrees and east longitude xx degrees, a title of A store 1, a server address of xx-xxxx-xxxx, and additional data of text data. Here, the number of service data is set to be M.

The process contents of the area service data selecting unit 146 are shown in FIG. 3. First, the region data of an area No. i which includes the present location is obtained from the area selecting unit 145 (S21), the service data No. 1 is designated (S22), and whether or not the position is within the region of the area No. i is judged (S23). If it is not in the region, the subsequent service data is designated one after another, and thus service data within the region of the area No. i is searched with regard to all the service data (S24 to S27). In the region, a display character is selected from the service type of service data No. 1 (S28), and the display position is designated and a display character is output (S29). Next, whether or not there is a request of additional data is judged (S30). If there is such a request, the additional data is output (S31), whereas if there is not, the state is maintained as it is, and it is judged whether or not there has been a change in area (S32).

Here, if there has been no change in area, the operation moves back to Step S24, where the next service data is designated and the above-described process is repeated. If there has been a change in area, the operation moves back to step S21 to execute the process from the beginning.

Figure 31:
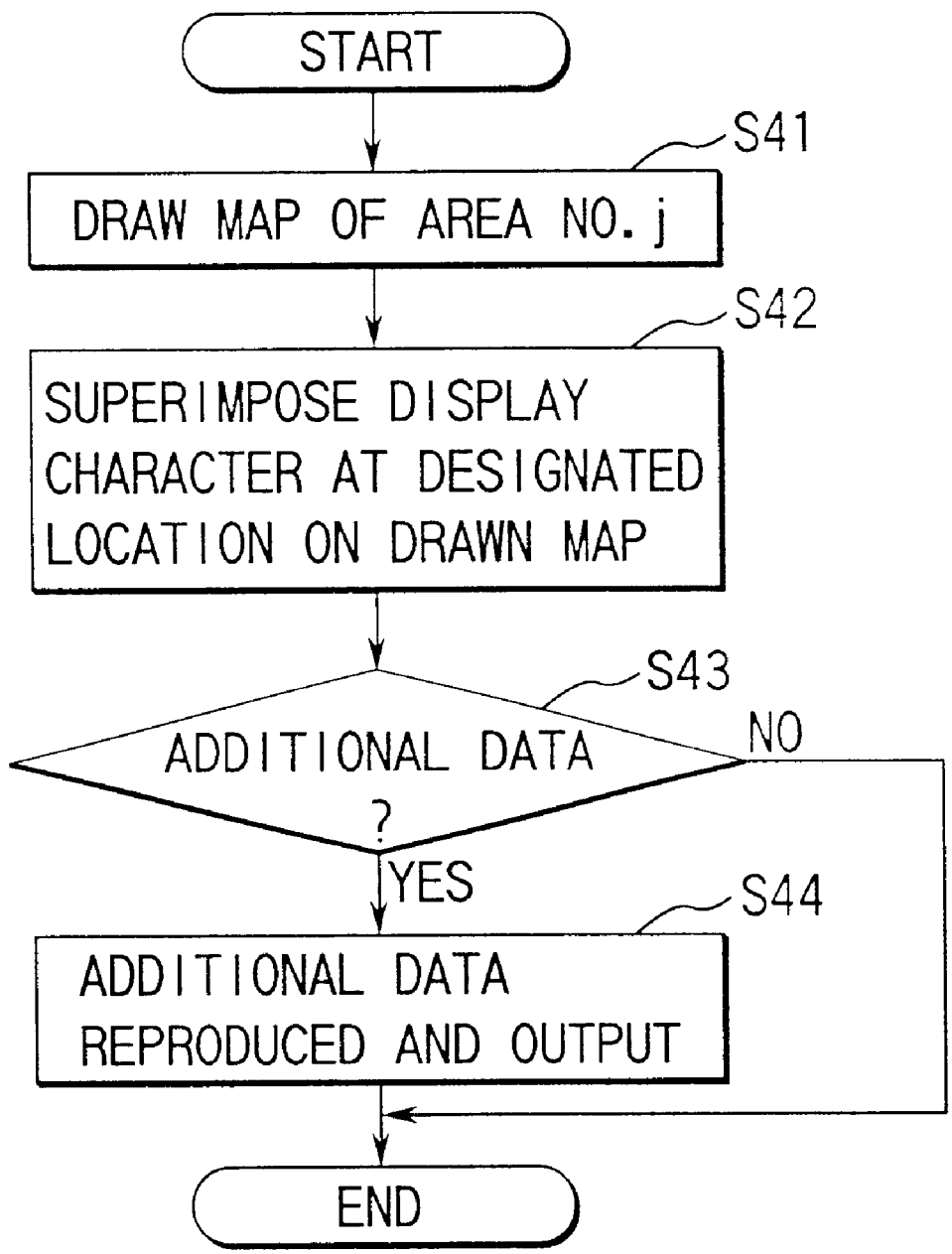
FIG. 31 is a flowchart illustrating the processing contents of the synthesizing portion in the seventh embodiment of the present invention.

In the above-described manner, area map data selected by the area selecting unit 147 and area service data (display character and additional data) selected by the area service data selecting unit 146 are both sent to the synthesizing unit 147. FIG. 31 shows the processing contents of the synthesizing unit 147.

In FIG. 31, first, a map of the area No. i is drawn from the map data selected from the area selecting unit 147 (S41), and a display character is superimposed at a designated location on the map drawn on the basis of the service data from the area service data selecting unit 146 (S42). Here, when there is a request of reproduction of additional data from the user, it is judged if the additional data is present or absent (S43). If the additional data is present, it is reproduced and output (S44), whereas if it is absent, a series of processing operations are finished.

Figure 32A:
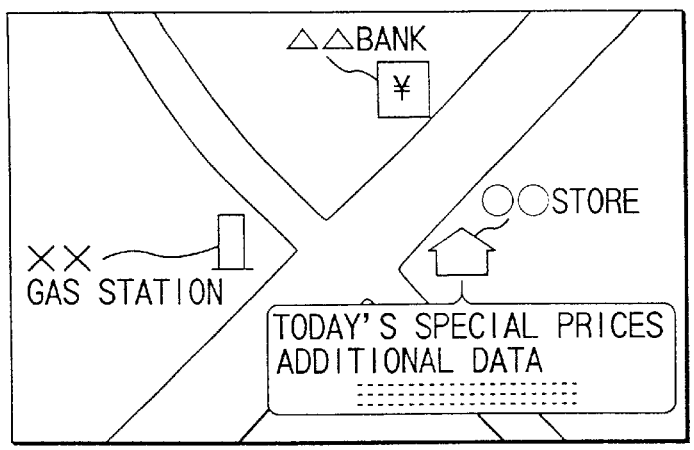
FIGS. 32A, 32B and 32C are diagrams illustrating display examples of the integration of related broadcast services, integration with ITS data, and integration with ground wave TV broadcasting, respectively, in the seventh embodiment of the present invention.
Figure 32B:
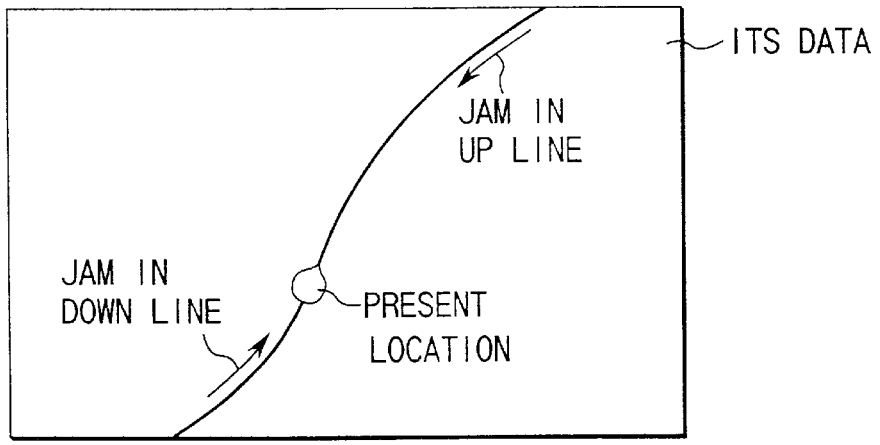

FIG. 32A shows a display example of service data formed by the synthesizing unit 147. In this example, texts which indicate facilities such as stores and public facilities, and their titles are displayed as they are superimposed on a road map. This figures shows that, when the user operates to select one of them by a touch panel, texts given as additional data are displayed by a pop up form.

There are several ways of presenting additional data considered. For example, if they are of text data, they can be read out in voice, and then the driver is no longer required to watch the screen, which is preferable in terms of safety. Or not in a pop up form, but the data may be displayed on the entire screen or in a telop form. Further, if the additional data is in image, sub-screen display, divisional display, screen switching display and the like are considered.

Here, it is preferable that the additional data should be in compliance with the format of MPEG 4. With this format, it becomes possible to free set the data to be synthesized with other objects.

Further, when an access address to the response server 310 is written in additional data, and its access guide is included in the additional data as provided service data, it is presented to the user in the form of image or sound. Here, when a selection operation is received through the touch panel, the mobile communication device 158 is automatically connected to the response server 310 via the mobile communication control device 151, and a necessary download operation (for example, area information) or upload operation (for example, answer to questionnaire or quiz, a request or the like) is executed. Thus, it is possible to integrate the invention with the mobile communication.

Next, the integration of the invention with other broadcast or communication media will now be described.

First, the integration with the ITS system will now be considered. That is, in FIG. 24, when there is ITS data received from the ITS signal receiver 155, the amount of traffic and the like are identified from the ITS data in the area service data selecting unit 146 or the synthesizing unit 147. Such data may be displayed on the display unit 148 as, display portions, for example, the range of a traffic jam, a site of road under construction, and a site of an accident which occurred, are superimposed on the map drawn, or the side of road under construction, the distance to the site of the accident occurred, and the guide to the detour are presented in sounds. As an example, FIG. 33B shows an display image in which a display part which indicates a traffic jam section formed from the ITS data is superimposed on a map formed of data from the area selecting unit 145.

Here, a specific example of the integration with the ITS system will be described.

Recently, in Japan, VICS (vehicle information and communication system) service started as one of the ITS systems. This service uses a communication line of, for example, an FM data multiplex broadcast to transmit traffic jam data to a car navigation device. The traffic jam data transmitted via the VICS include link jam data and link travel data. A link is a unit of a road partitioned by main intersections. The link jam data provides the traffic jam status of each link by categorizing it into four steps, namely "jam-up", "heavy", "light" and "no information available". The link travel time is a time required to pass through a link.

In the above-described car navigation device, the roads of the built-in map database are associated with the links in advance so that it becomes able to separate the road by different colors, and perform a dynamic route navigation and the like. It should be noted that the state where the roads on the map need be separated by different colors is called a VICS level 3. In level 1, only text data is indicated, and in level 2, simplified vector graphic display is indicated; therefore it is not necessary to consider the location of the link on the display screen (naturally, location data of a link is necessary for navigation and dynamic route search).

This link itself is not very frequently revised for its nature; however for the in-advance preparation of the area enlargement to be subjected to VICS, it is considered advantageous to provide link adding means. The data regarding link (which road, the name of the intersection of the starting point or finishing point, absolute coordinates of these, and the like) are not transmitted via VICS, and therefore it is necessary that they should be stored in CD-ROM in advance (car navigation mode), or such data are stored in the terminal side via data distribution such as broadcasting.

With the present invention, when broadcasting map data, latest link data itself which has been subjected to revision, addition and deletion are broadcasted, and link data is accumulated in the terminal device side to make a database.

An example of link data is shown in FIG. 33. In each link number of the link data, the name of the intersections of the starting point and finishing point, and their coordinates are indicated. In the case where VICS data is newly obtained, it is checked if the traffic status is "jam-up", if it is not "jamup", the process is finished. On the other hand, if it is "jam-up", coordinates 1 of the intersection at the starting point and coordinates 2 of the intersection at the finishing point are obtained from the link number of VICS data and link database. Then, it is judged if each set of them is included in an area 1 presently displayed, and if none of them are included, the process is finished. If included, a text which indicates "jam-up" is displayed at the location of the coordinates.

It should be noted that when a link database is provided in advance in the terminal device, and only data regarding revision, addition or deletion to the link data on the database is broadcasted, to renew the database of the terminal device one after another, it is possible to save the time for accumulating the link data for the first time.

It is also possible that, in the VICS, only text data of level 1 is obtained, and it is displayed on the receiver's screen of the original digital broadcasting in a telop mode.

Figure 32C:
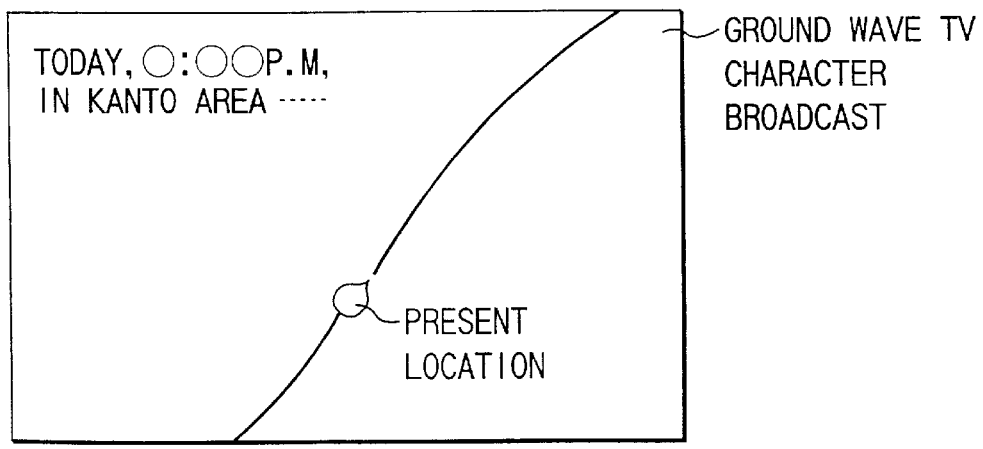

Next, the integration with the ground wave TV broadcast is considered. As data utilized in the conventional broadcast, text data in character multiplexion broadcast or text data are considered. In this case, a character multiplex broadcast is received by a ground wave TV receiver 157 and the text data is developed by the area service data selecting unit 146 or synthesizing unit 147 in a predetermined region on the screen to be displayed in a telop mode on the display unit 148. An example is shown in FIG. 32C, which illustrates that text data obtained by a TV receiver 155 is superimposed and displayed in a telop mode on a map formed by data from the area selecting unit 145.

Further, in the case where regional data such as weather forecast is received by character multiplex broadcast, it is more advantageous that such data is interpreted and displayed in text on the map. Further, as the digital broadcast is being improved as advanced TV broadcast. Under these circumstances, when a program is provided in compliance with the MPEG 4, the contents of the program can be freely and easily taken in.

(Other Embodiment)

The structures of the first to third embodiments and those of the fourth to sixth embodiments may be incorporated in appropriate combinations in accordance with necessity to make other embodiments.

Further, the above-described embodiments are described in connection with the case of a digital satellite broadcast system; however the present invention is applicable to a digital broadcast system which uses a ground wave.

Further, in any of the first to sixth embodiments, objects are decoded by the decoders 44 to 46, and then selected by the selecting unit 49 in accordance with the scene description data. Further, they are selectively synthesized by the synthesizing unit 50. However, it is also possible that objects are selected by the selection unit 49 on the basis of the scene description data, and then thus selected objects are decoded to be synthesized.

Further, in the seventh embodiment, the integration with TV broadcast is explained, but naturally the integration with the radio broadcast is similarly practicable. Further, it is possible that when a high-fidelity television broadcast in other satellite broadcast is broadcasted at low rate, the high-fidelity television broadcast is received and displayed while standing or traveling at low speed. On the other hand, while traveling at high speed, a broadcast from the main satellite broadcast system can be received and displayed. Further, when a mobile communication device is utilized, it becomes possible to watch a TV program distributed via the Internet or the like.

Further, the seventh embodiment is described in connection with the case where the touch panel is used by the user to make a selection. For inputting an instruction of selection, a voice recognition device, remote controller and the like can be utilized. In particular, in the case where the voice recognition device is used, the user can set an instruction without changing the eye view while driving, which is preferable in terms of safety.

In the seventh embodiment, map data is provided all in broadcasting; but it is also possible that renewal data is provided for the map data already set in the conventional car navigation system.

Further, it is also considered that still image and text data are provided in cooperation with a radio broadcast, or program data is provided in cooperation with a television broadcast.

Moreover, as the encoding method employed in a digital satellite broadcast system for mobile station s, there is a plan of using an MPEG4; however the present invention is not limited to this, but, for example, MHEG (Multimedia and Hypermedia Expert Group) and the like can be used. The format of indicating scene description data may be of any type of it's own, and various formats such as HTML (Hyper Text Markup Language) and XML (eXtensible Markup Language: one of metalanguges for describing data structurally).

INDUSTRIAL APPLICABILTY

As described above in detail, according to the present invention, there is provided a digital broadcasting system which not only merely provides a program as a broadcast service when broadcasting multimedia data containing picture, sound, texts and the like, to a terminal device built in, mainly, a mobile station, but also is capable of presenting data which can flexibly follow up the needs and the use state of the user with the program contents themselves, as well as a terminal device therefor.

As a result, there is provided a digital broadcasting system capable of presenting data optimal to the status of the terminal device, together with a terminal device. Further, there is provided a digital broadcasting system for providing a broadcasting service from a new point of view, and capable of contributing to the development of the information society, by integrating a plurality of broadcasting services together and further integrating a new service with a conventional medium.

What is claimed is:

1. A terminal device used in a digital broadcast system for multiplexing one or more objects along with scene description data to obtain a multiplex signal, and converting the multiplex signal into a broadcast signal in a broadcast station, so as to be broadcasted towards a predetermined service area, said one or more objects comprising scenes of a program provided, the scene description data containing data for selectively synthesizing said one or more objects and providing each of said one or more scenes, said terminal device comprising:

receiver means for receiving the broadcast signal and reproducing said one or more objects and the scene description data from the received signal;

status detection means for detecting a predetermined status of a self device; and a data base in which set data each indicating a relationship in terms of correspondence between the status of the self device and an object to be presented to the user are stored;

object selecting means for selecting objects to be presented from said one or more objects reproduced by the receiver means, on the basis of a detection result by the status detection means, the set data of the data base and the scene description data; and a presentation device for presenting the objects selected by the selecting means.

2. A terminal device used in a digital broadcast system for multiplexing one or more objects along with scene description data to obtain a multiplex signal, and converting the multiplex signal into a broadcast signal in a broadcast station, so as to be broadcasted towards a predetermined service area on a ground by relaying the broadcast signal via a satellite, said one or more objects comprising scenes of a program provided, the scene description data containing data for selectively synthesizing said one or more objects and providing each of said one or more scenes, the terminal device comprising:

receiver means for receiving the broadcast signal and reproducing the one or more objects and the scene description data from the received signal;

status detection means for detecting a predetermined status of a self device;

database in which setting data each indicating a relationship in terms of correspondence between the status of the self device and an object to be presented to the user are stored;

object selecting means for selecting objects to be presented from said one or more objects reproduced by the receiver means, on the basis of a detection result by the status detection means, the setting data of the database and the scene description data; and a presentation device for presenting the objects selected by the selecting means.

3. A terminal device used in a digital broadcast system according to claim 1 or 2, wherein:

the status detection means includes location detection means for detecting a present location of the self device;

the database stores the setting data each indicating a relationship in terms of correspondence between the status of the self device and an object to be presented to the user; and the object selecting means selects an object corresponding to the present location of the self device from the one or more objects reproduced by the receiver means, on the basis of the present location of the self device, detected by the location detection means and the setting data of the database.

4. A terminal device used in a digital broadcast system according to claim 1 or 2, wherein:

the status detection means includes moving state detection means for detecting a moving state of the self device;

the database stores, in advance, the setting data each indicating a relationship in terms of correspondence between the moving state of the self device and an object to be presented to the user; and the object selecting means selects an object corresponding to the moving state of the self device from the one or more objects reproduced by the receiver means, on the basis of the moving state of the self device, detected by the moving state detection means and the setting data of the database.

5. A terminal device used in a digital broadcast system according to claim 1 or 2, wherein:
the status detection means includes presentation type detection means for detecting a type of the presentation device;
the database stores, in advance, the setting data each indicating a relationship in terms of correspondence between the type of the presentation device and an object to be presented to the user; and
the object selecting means selects an object corresponding to the type of the presentation device from the one or more objects reproduced by the receiver means, on the basis of the type of the presentation device, detected by the presentation type detection means and the setting data of the database.

6. A terminal device used in a digital broadcast system according to claim 1 or 2, wherein:
when the broadcast station inputs renewal data for renewing setting data stored in the database, in the broadcast signal,
the receiver means reproduces the renewal data from the received signal; and
the terminal device further comprises renewal control means for renewing setting data stored in the database in accordance with the renewal data reproduced by the receiver means.

7. A digital broadcasting system in which one or more objects which constitute scenes of a provided program, and scene description data containing data used for synthesizing and presenting these objects, are converted into broadcast signals in a broadcast station, and the broadcast signals are transmitted to a terminal device, wherein:
the broadcast station comprises condition designation data transmitting means for transmitting the broadcast signal with condition designation data for designating presentation condition of the objects, contained therein; and
the terminal device includes: receiver means for receiving the broadcast signal and reproducing one or more objects, scene description data and condition designation data, respectively, from the received signal; status detection means for detecting a predetermined status of the self device; object selection means for selecting an object to be presented, from the one or more objects reproduced by the receiver means; and a presentation device for presenting the object selected by the selection means on the basis of the scene description data reproduced by the receiver means.

8. A digital broadcasting system in which one or more objects which constitute scenes of a provided program, and scene description data containing data used for synthesizing and presenting these objects, are converted into broadcast signals in a broadcast station, and the broadcast signals are transmitted to a terminal device present in a predetermined service area on a ground by relaying the broadcast signals via a satellite, wherein:
the broadcast station comprises condition designation data transmitting means for transmitting the broadcast signal with condition designation data for designating presentation condition of the objects, contained therein; and
the terminal device includes: receiver means for receiving the broadcast signal and reproducing one or more objects, scene description data and condition designation data, respectively, from the received signal; status detection means for detecting a predetermined status of the self device; object selection means for selecting an object to be presented, from the one or more objects reproduced by the receiver means; and a presentation device for presenting the object selected by the selection means on the basis of the scene description data reproduced by the receiver means.

9. A digital broadcast system according to claim 7 or 8, wherein the condition designation data transmitting means transmits the scene description data with condition designation data for designating presentation condition of the objects, contained therein.

10. A digital broadcast system according to claim 7 or 8, wherein:
the condition designation data transmission means transmits region designation data for designating a presentation region for each object constituting a scene as one of the condition designation data;
the status detection means includes location detection means for detecting a present location of the self device; and
the object selection means compares the present location of the self device detected by the location detection means and the region designation data reproduced by the receiver means, with each other, and selects an object corresponding to the present location of the self device on the basis of a result of the comparison.

11. A digital broadcast system according to claim 7 or 8, wherein:
the condition designation data transmission means transmits movement state type designation data for performing presentation in accordance with the moving state of the terminal device for each object constituting a scene as one of the condition designation data;
the receiver means reproduces movement state type designation data which is one of the condition designation data from the receiver signal;
the status detection means includes movement state detection means for detecting a movement state of the self device; and
the object selection means compares the movement state of the self device detected by the movement state detection means and the movement state type designation data reproduced by the receiver means, with each other, and selects an object corresponding to the movement state of the self device on the basis of a result of the comparison.

12. A digital broadcast system according to claim 7 or 8, wherein:
the condition designation data transmission means transmits type designation data for designating a type of a presentation device capable of presentation for each object constituting a scene as one of the condition designation data;
the receiver means reproduces presentation type designation data which is one of the condition designation data from the receiver signal;
the status detection means includes presentation type detection means for detecting the type of the presentation device; and
the object selection means compares the type of the presentation device detected by the presentation type detection means and the type designation data reproduced by the receiver means, with each other, and selects and transmits an object corresponding to the designated type of the presentation device on the basis of a result of the comparison.

13. A terminal device used in a digital broadcasting system in which one or more objects which constitute scenes of a provided program, scene description data containing data used for synthesizing and presenting these objects, and condition designation data for designating a presentation condition of the objects, are converted into broadcast signals in a broadcast station, to be transmitted towards a predetermined service area, the terminal device comprising:

receiver means for receiving the broadcast signal and reproducing one or more objects, scene description data and condition designation data, respectively, from the received signal;

status detection means for detecting a predetermined status of the self device;

object selection means for selecting an object to be presented, from the one or more objects reproduced by the receiver means, on the basis of a result of the detection by the status detection means and the condition designation data reproduced by the receiver means; and a presentation device for presenting the object selected by the selection means.

14. A terminal device used in a digital broadcasting system in which one or more objects which constitute scenes of a provided program, scene description data containing data used for synthesizing and presenting these objects, and condition designation data for designating a presentation condition of the objects, are converted into broadcast signals in a broadcast station, and the broadcast signals are broadcasted towards a predetermined service area on a ground by relaying them via a satellite, the terminal device comprising:

receiver means for receiving the broadcast signal and reproducing one or more objects, scene description data and condition designation data from the received signal;

status detection means for detecting a predetermined status of the self device;

object selection means for selecting an object to be presented, from the one or more objects reproduced by the receiver means, on the basis of a result of the detection by the status detection means and the condition designation data reproduced by the receiver means; and a presentation device for presenting the object selected by the selection means.

15. A terminal device used in a digital broadcast system according to claim 13 or 14, wherein:

when the broadcast station transmits the broadcast signal with region designation data for designating a presentation region for each object constituting a scene, as one of the condition designation data, the receiver means reproduces region designation data, which is one of the condition designation data from the received signal;

the status detection data includes location detection means for detecting a present location of a self device; and the object selection means compares the present location of the self device detected by the location detection means and the region designation data reproduced by the receiver means, with each other, and selects an object corresponding to the present location of the self device on the basis of a result of the comparison.

16. A terminal device used in a digital broadcast system according to claim 13 or 14, wherein:

when the broadcast station transmits the movement state type designation data for performing a presentation in accordance with the movement status of the terminal device, for each object constituting a scene, as one of the condition designation data, the receiver means reproduces movement state type designation data which is one of the condition designation data from the receiver signal;

the status detection means includes movement state detection means for detecting a movement state of the self device; and the object selection means compares the movement state of the self device detected by the movement state detection means and the movement state type designation data reproduced by the receiver means, with each other, and selects an object corresponding to the movement state of the self device on the basis of a result of the comparison.

17. A terminal device used in a digital broadcast system according to claim 13 or 14, wherein:

when the broadcast station transmits the presentation type designation data for designating the type of the presentation device for each object constituting a scene, as one of the condition designation data, the receiver means reproduces presentation type designation data which is one of the condition designation data from the receiver signal;

the status detection means includes presentation type detection means for detecting the type of the presentation device; and the object selection means compares the type of the presentation device detected by the presentation type detection means and the type designation data reproduced by the receiver means, with each other, and selects and transmits an object corresponding to the designated type of the presentation device on the basis of a result of the comparison.

18. A terminal device used for the digital broadcasting system, which provides a broadcast service containing at least one of picture, sound and data, the terminal comprising:

a broadcast receiver unit for receiving a plurality of broadcast services related to each other between arbitrary channels, of broadcast signals of the plurality of channels;

data synthesizing means for synthesizing data of a plurality of broadcast services related to each other, received by the broadcast receiver, to present it as one broadcast service; and a display device and sound reproduction device for displaying image and sound of a broadcast service presented by the data synthesizing means, wherein the broadcast services related between the arbitrary channels are broadcast service for providing map data, and broadcast service for providing data of facilities and region, which include location data on the map, the broadcast service which provides the map data fractionize a map of an entire broadcast area, with addition of location data to each part, and the terminal device includes present location data acquiring means for acquiring a present location of a self, the data synthesizing means comprising:

area identification means for identifying a divided area on the map, obtained from present location data acquired by the present location data acquiring means;

data selection means for selecting a facility or region data, which is included in the area identified by the area identification means, from data provided by the facility or region data broadcast service; and image synthesizing means for developing the map identified by the area identification means and synthesizing the facility or region data selected by the data selection means on the map in a predetermined format, and wherein when traffic control data receiver means is equipped, the data synthesizing means synthesizes contents of traffic control data obtained by the traffic control data receiver means, on the map in a predetermined format.

19. A terminal device used for the digital broadcasting system, which provides a broadcast service containing at least one of picture, sound and data, the terminal comprising:

a broadcast receiver unit for receiving a plurality of broadcast services related to each other between arbitrary channels, of broadcast signals of the plurality of channels;

data synthesizing means for synthesizing data of a plurality of broadcast services related to each other, received by the broadcast receiver, to present it as one broadcast service; and a display device and sound reproduction device for displaying image and sound of a broadcast service presented by the data synthesizing means, wherein the broadcast services related between the arbitrary channels are broadcast service for providing map data, and broadcast service for providing data of facilities and region, which include location data on the map, the broadcast service which provides the map data fractionize a map of an entire broadcast area, with addition of location data to each part, and the terminal device includes present location data acquiring means for acquiring a present location of a self, the data synthesizing means comprising:

area identification means for identifying a divided area on the map, obtained from present location data acquired by the present location data acquiring means;

data selection means for selecting a facility or region data, which is included in the area identified by the area identification means, from data provided by the facility or region data broadcast service; and image synthesizing means for developing the map identified by the area identification means and synthesizing the facility or region data selected by the data selection means on the map in a predetermined format, and wherein when ground wave broadcast receiver means is equipped, the image synthesizing means takes in data of a ground wave broadcast program designated by the user, obtained by the ground wave broadcast receiver means, and synthesize images in a predetermined format.

20. A terminal device used for the digital broadcasting system, which provides a broadcast service containing at least one of picture, sound and data, the terminal comprising:

a broadcast receiver unit for receiving a plurality of broadcast services related to each other between arbitrary channels, of broadcast signals of the plurality of channels;

data synthesizing means for synthesizing data of a plurality of broadcast services related to each other, received by the broadcast receiver, to present it as one broadcast service; and a display device and sound reproduction device for displaying image and sound of a broadcast service presented by the data synthesizing means, wherein when there is a server who provides data relating to this digital broadcast via a public communication network, and acquires data from the user, an access guide is provided to the server in the broadcast service, and communication means with the public communication network is provided, the data synthesizing means includes server access guide presentation means for presenting the server access guide to the user via the display device or audio reproduction device, and the terminal device further comprises server connection instruction detection means for detecting a server connection instruction of the user by presenting the server access guide, and communication control means for automatically connecting the communication means to the server when the server connection instruction is detected by the detection means, and executing communication on the basis of contents of the server access guide.

21. A terminal device of a digital broadcast system according to claim 20, further comprising:

an input device for inputting a user selection instruction to the server connection instruction detection means.

22. A terminal device of a digital broadcast system according to claim 21, wherein the input device is either one of a remote controller for the receiver device, a touch panel device provided on the display screen of the display device and a voice recognition device for recognizing an input voice of the user.

* * * * *